(12) United States Patent
Powers et al.

(10) Patent No.: US 9,188,804 B2
(45) Date of Patent: Nov. 17, 2015

(54) METHODS FOR FABRICATING THERMOCHROMIC FILTERS

(71) Applicant: RAVENBRICK, LLC, Denver, CO (US)

(72) Inventors: Richard M. Powers, Lakewood, CO (US); Wil McCarthy, Lakewood, CO (US); Matthew Bryant Kish, Denver, CO (US)

(73) Assignee: RAVENBRICK LLC, Denver, CO (US)

( * ) Notice: Subject to any disclaimer, the term of this patent is extended or adjusted under 35 U.S.C. 154(b) by 0 days.

(21) Appl. No.: 14/196,998

(22) Filed: Mar. 4, 2014

(65) Prior Publication Data

US 2014/0183766 A1 Jul. 3, 2014

Related U.S. Application Data

(63) Continuation of application No. 12/545,051, filed on Aug. 20, 2009, now Pat. No. 8,665,414.

(60) Provisional application No. 61/157,086, filed on Mar. 3, 2009, provisional application No. 61/105,351, filed on (Continued)

(51) Int. Cl.
*G02F 1/133* (2006.01)
*G02F 1/1334* (2006.01)

(Continued)

(52) U.S. Cl.
CPC ............... *G02F 1/1334* (2013.01); *F24J 2/04* (2013.01); *F24J 2/407* (2013.01); *G02B 5/23* (2013.01);

(Continued)

(58) Field of Classification Search
CPC .... G02F 1/132; G02F 1/1334; C09K 2219/13
USPC .......................................................... 349/20
See application file for complete search history.

(56) References Cited

U.S. PATENT DOCUMENTS 3,990,784 A 11/1976 Gelbert
4,006,730 A 2/1977 Clapham et al.
(Continued)

FOREIGN PATENT DOCUMENTS

CA 2620005 A1 7/2008
CN 1189224 A 7/1998
(Continued)

OTHER PUBLICATIONS

Author Unknown, "Liquid Crystal Research", http://chirality.swarthmore.edu (Aug. 21, 2009), 8 pages.
(Continued)

*Primary Examiner* — Paisley L Arendt
(74) *Attorney, Agent, or Firm* — Dorsey & Whitney LLP

(57) ABSTRACT

Thermochromic liquid crystal filters are fabricated by providing two polarizers oriented at offset polarity with respect to each other; providing alignment structures adjacent the inner surfaces of the polarizers; placing a plurality of spacers between the polarizers; and filling a space created by the spacers with a thermotropic liquid crystal that acts as a wave block in an isotropic state and acts to rotate the polarization of light in a nematic state. Alternatively, the filters can be created by encapsulating a thermochromic liquid crystal with a polymer material to form a flexible film and orienting the thermochromic liquid crystal in the polymer material to create a structure that functions as a thermochromic optical filter. Such filters can control the flow of light and radiant heat through selective reflection, transmission, absorption, and/or re-emission. The filters have particular application in passive or active light-regulating and temperature-regulating films, materials, and devices, and particularly as construction materials.

14 Claims, 9 Drawing Sheets

Related U.S. Application Data on Oct. 14, 2008, provisional application No. 61/096,042, filed on Sep. 11, 2008, provisional application No. 61/094,348, filed on Sep. 4, 2008, provisional application No. 61/090,567, filed on Aug. 20, 2008.

(51) Int. Cl.

| | | |
|---|---|---|
| *G02B 5/23* | (2006.01) | |
| *F24J 2/04* | (2006.01) | |
| *F24J 2/40* | (2006.01) | |
| *G02F 1/13* | (2006.01) | |
| *G02F 1/1339* | (2006.01) | |
| *G02F 1/1333* | (2006.01) | |

(52) U.S. Cl.
CPC ............ *G02F 1/132* (2013.01); *C09K 2219/13* (2013.01); *G02F 1/1339* (2013.01); *G02F 1/133305* (2013.01); *Y02E 10/44* (2013.01)

(56) References Cited

U.S. PATENT DOCUMENTS

| | | | |
|---|---|---|---|
| 4,155,895 A | 5/1979 | Rohowetz et al. | |
| 4,268,126 A | 5/1981 | Mumford | |
| 4,456,335 A | 6/1984 | Mumford | |
| 4,475,031 A | 10/1984 | Mockovciak, Jr. | |
| 4,491,390 A | 1/1985 | Tong-Shen | |
| 4,512,638 A | 4/1985 | Sriram et al. | |
| 4,579,638 A | 4/1986 | Scherber | |
| 4,640,583 A | 2/1987 | Hoshikawa et al. | |
| 4,641,922 A | 2/1987 | Jacob | |
| 4,688,900 A | 8/1987 | Doane et al. | |
| 4,688,901 A * | 8/1987 | Albert | 349/86 |
| 4,755,673 A | 7/1988 | Pollack et al. | |
| 4,756,758 A | 7/1988 | Lent et al. | |
| 4,783,150 A | 11/1988 | Tabony | |
| 4,789,500 A | 12/1988 | Morimoto et al. | |
| 4,804,254 A | 2/1989 | Doll et al. | |
| 4,848,875 A | 7/1989 | Baughman et al. | |
| 4,859,994 A | 8/1989 | Zola et al. | |
| 4,871,220 A | 10/1989 | Kohin | |
| 4,877,675 A | 10/1989 | Falicoff et al. | |
| 4,893,902 A | 1/1990 | Baughman et al. | |
| 4,899,503 A | 2/1990 | Baughman et al. | |
| 4,964,251 A | 10/1990 | Baughman et al. | |
| 5,009,044 A | 4/1991 | Baughman et al. | |
| 5,013,918 A | 5/1991 | Choi | |
| 5,025,602 A | 6/1991 | Baughman et al. | |
| 5,111,629 A | 5/1992 | Baughman et al. | |
| 5,132,147 A | 7/1992 | Takiguchi et al. | |
| 5,152,111 A | 10/1992 | Baughman et al. | |
| 5,193,900 A | 3/1993 | Yano et al. | |
| 5,196,705 A | 3/1993 | Ryan | |
| 5,197,242 A | 3/1993 | Baughman et al. | |
| 5,212,584 A | 5/1993 | Chung | |
| 5,227,115 A | 7/1993 | Harnischfeger | |
| 5,274,246 A | 12/1993 | Hopkins et al. | |
| 5,304,323 A | 4/1994 | Arai et al. | |
| 5,308,706 A | 5/1994 | Kawaguchi et al. | |
| 5,319,478 A | 6/1994 | Funfschilling et al. | |
| 5,347,140 A | 9/1994 | Hirai et al. | |
| 5,377,042 A | 12/1994 | Chahroudi | |
| 5,481,400 A | 1/1996 | Borden | |
| 5,525,430 A | 6/1996 | Chahroudi | |
| 5,530,263 A | 6/1996 | DiVincenzo | |
| 5,574,286 A | 11/1996 | Huston et al. | |
| 5,585,035 A | 12/1996 | Nerad et al. | |
| 5,585,640 A | 12/1996 | Huston et al. | |
| 5,757,828 A | 5/1998 | Ouchi | |
| 5,763,307 A | 6/1998 | Wang et al. | |
| 5,881,200 A | 3/1999 | Burt | |
| 5,889,288 A | 3/1999 | Futatsugi | |
| 5,897,727 A | 4/1999 | Staral et al. | |
| 5,897,957 A | 4/1999 | Goodman | |
| 5,937,295 A | 8/1999 | Chen et al. | |
| 5,940,150 A | 8/1999 | Faris | |
| 5,948,486 A | 9/1999 | Sage et al. | |
| 5,968,411 A | 10/1999 | Hall et al. | |
| 6,010,641 A | 1/2000 | Sage et al. | |
| 6,030,668 A | 2/2000 | Hall et al. | |
| 6,040,859 A | 3/2000 | Takahashi | |
| 6,055,089 A | 4/2000 | Schulz et al. | |
| 6,099,752 A | 8/2000 | Hall et al. | |
| 6,099,758 A | 8/2000 | Verrall et al. | |
| 6,122,103 A | 9/2000 | Perkins et al. | |
| 6,124,918 A | 9/2000 | Park et al. | |
| 6,208,463 B1 | 3/2001 | Hansen et al. | |
| 6,218,018 B1 | 4/2001 | McKown et al. | |
| 6,226,067 B1 | 5/2001 | Nishiguchi et al. | |
| 6,240,114 B1 | 5/2001 | Anselm et al. | |
| 6,260,414 B1 | 7/2001 | Brown et al. | |
| 6,277,451 B1 | 8/2001 | Mehl et al. | |
| 6,281,519 B1 | 8/2001 | Sugiyama et al. | |
| 6,288,840 B1 | 9/2001 | Perkins et al. | |
| 6,294,794 B1 | 9/2001 | Yoshimura et al. | |
| 6,304,784 B1 | 10/2001 | Allee et al. | |
| 6,312,770 B1 | 11/2001 | Sage et al. | |
| 6,320,220 B1 | 11/2001 | Watanabe et al. | |
| 6,329,668 B1 | 12/2001 | Razeghi | |
| 6,333,516 B1 | 12/2001 | Katoh et al. | |
| 6,381,068 B1 | 4/2002 | Harada et al. | |
| 6,437,361 B1 | 8/2002 | Matsuda | |
| 6,446,402 B1 | 9/2002 | Byker et al. | |
| 6,486,997 B1 | 11/2002 | Bruzzone et al. | |
| 6,487,112 B1 | 11/2002 | Wasshuber | |
| 6,493,482 B1 | 12/2002 | Al-hemyari et al. | |
| 6,498,354 B1 | 12/2002 | Jefferson et al. | |
| 6,504,588 B1 | 1/2003 | Kaneko | |
| 6,512,242 B1 | 1/2003 | Fan et al. | |
| 6,559,903 B2 | 5/2003 | Faris et al. | |
| 6,583,827 B2 | 6/2003 | Faris et al. | |
| 6,600,169 B2 | 7/2003 | Stintz et al. | |
| 6,611,640 B2 | 8/2003 | LoCascio et al. | |
| 6,635,898 B2 | 10/2003 | Williams et al. | |
| 6,661,022 B2 | 12/2003 | Morie et al. | |
| 6,671,008 B1 | 12/2003 | Li et al. | |
| 6,710,823 B2 | 3/2004 | Faris et al. | |
| 6,718,086 B1 | 4/2004 | Ford et al. | |
| 6,730,909 B2 | 5/2004 | Butler | |
| 6,753,273 B2 | 6/2004 | Holonyak, Jr. et al. | |
| 6,770,916 B2 | 8/2004 | Ohshima | |
| 6,777,718 B2 | 8/2004 | Takagi | |
| 6,816,525 B2 | 11/2004 | Stintz et al. | |
| 6,819,845 B2 * | 11/2004 | Lee et al. | 385/122 |
| 6,847,662 B2 | 1/2005 | Bouda et al. | |
| 6,859,114 B2 | 2/2005 | Eleftheriades et al. | |
| 6,912,018 B2 | 6/2005 | Faris et al. | |
| 6,926,952 B1 | 8/2005 | Weber et al. | |
| 6,933,812 B2 | 8/2005 | Sarabandi et al. | |
| 6,946,697 B2 | 9/2005 | Pietambaram et al. | |
| 6,963,435 B2 | 11/2005 | Mallya et al. | |
| 6,965,420 B2 | 11/2005 | Li et al. | |
| 6,978,070 B1 | 12/2005 | McCarthy et al. | |
| 6,985,291 B2 | 1/2006 | Watson et al. | |
| 6,992,822 B2 | 1/2006 | Ma et al. | |
| 7,026,641 B2 | 4/2006 | Mohseni et al. | |
| 7,038,745 B2 | 5/2006 | Weber et al. | |
| 7,042,615 B2 | 5/2006 | Richardson | |
| 7,046,441 B2 | 5/2006 | Huang et al. | |
| 7,068,234 B2 | 6/2006 | Sievenpiper | |
| 7,099,062 B2 | 8/2006 | Azens et al. | |
| 7,113,335 B2 | 9/2006 | Sales | |
| 7,133,335 B2 | 11/2006 | Nishimura et al. | |
| 7,154,451 B1 | 12/2006 | Sievenpiper | |
| 7,161,737 B2 | 1/2007 | Umeya | |
| 7,166,797 B1 | 1/2007 | Dziendziel et al. | |
| 7,221,827 B2 | 5/2007 | Domash et al. | |
| 7,245,431 B2 | 7/2007 | Watson et al. | |
| 7,276,432 B2 | 10/2007 | McCarthy et al. | |
| 7,300,167 B2 * | 11/2007 | Fernando et al. | 359/609 |
| 7,306,833 B2 | 12/2007 | Martin et al. | |
| 7,318,651 B2 | 1/2008 | Chua et al. | |
| 7,351,346 B2 | 4/2008 | Little | |
| 7,385,659 B2 | 6/2008 | Kotchick et al. | |

(56) References Cited

U.S. PATENT DOCUMENTS

| | | |
|---|---|---|
| 7,470,925 B2 | 12/2008 | Tamura et al. |
| 7,522,124 B2 | 4/2009 | Smith et al. |
| 7,532,397 B2 | 5/2009 | Tanaka et al. |
| 7,538,946 B2 | 5/2009 | Smith et al. |
| 7,561,332 B2 | 7/2009 | Little et al. |
| 7,601,946 B2 | 10/2009 | Powers et al. |
| 7,619,816 B2 | 11/2009 | Deng et al. |
| 7,655,942 B2 | 2/2010 | McCarthy et al. |
| 7,692,180 B2 | 4/2010 | Snyder et al. |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers et al. |
| 7,977,621 B2 | 7/2011 | McCarthy et al. |
| 8,072,672 B2 | 12/2011 | Powers et al. |
| 8,076,661 B2 | 12/2011 | McCarthy et al. |
| 8,169,685 B2 | 5/2012 | Powers et al. |
| 8,271,241 B2 | 9/2012 | Akyurtlu et al. |
| 8,484,336 B2 | 7/2013 | Meir et al. |
| 2002/0079485 A1 | 6/2002 | Stintz et al. |
| 2002/0080842 A1 | 6/2002 | An et al. |
| 2002/0085151 A1 | 7/2002 | Faris et al. |
| 2002/0114367 A1 | 8/2002 | Stintz et al. |
| 2002/0118328 A1 | 8/2002 | Faris et al. |
| 2002/0141029 A1 | 10/2002 | Carlson et al. |
| 2002/0152191 A1 | 10/2002 | Hollenberg et al. |
| 2002/0180916 A1 | 12/2002 | Schadt et al. |
| 2002/0190249 A1 | 12/2002 | Williams et al. |
| 2003/0035885 A1 | 2/2003 | Zang et al. |
| 2003/0052317 A1 | 3/2003 | Ohshima |
| 2003/0059998 A1 | 3/2003 | Holonyak, Jr. et al. |
| 2003/0066998 A1 | 4/2003 | Lee |
| 2003/0107813 A1 | 6/2003 | Clabburn et al. |
| 2003/0107927 A1 | 6/2003 | Yerushalmi et al. |
| 2003/0129247 A1 | 7/2003 | Ju et al. |
| 2003/0138209 A1 | 7/2003 | Chan |
| 2003/0214632 A1 | 11/2003 | Ma et al. |
| 2003/0218712 A1 | 11/2003 | Kumar et al. |
| 2003/0227663 A1 | 12/2003 | Agrawal et al. |
| 2004/0005451 A1 | 1/2004 | Kretman et al. |
| 2004/0012749 A1 | 1/2004 | Freeman |
| 2004/0027530 A1 | 2/2004 | Noiri et al. |
| 2004/0036993 A1 | 2/2004 | Tin |
| 2004/0113123 A1 | 6/2004 | Iftime et al. |
| 2004/0115366 A1 | 6/2004 | Iftime et al. |
| 2004/0150766 A1 | 8/2004 | Choo et al. |
| 2004/0244882 A1 | 12/2004 | Lobanov et al. |
| 2004/0256612 A1 | 12/2004 | Mohseni et al. |
| 2005/0003107 A1 | 1/2005 | Kumar et al. |
| 2005/0068629 A1 | 3/2005 | Fernando et al. |
| 2005/0099574 A1 | 5/2005 | Ueyama |
| 2005/0185125 A1 | 8/2005 | Miyachi et al. |
| 2005/0221128 A1 | 10/2005 | Kochergin |
| 2005/0248715 A1 | 11/2005 | Byun et al. |
| 2005/0271092 A1 | 12/2005 | Ledentsov et al. |
| 2006/0147810 A1* | 7/2006 | Koch ................................ 430/1 |
| 2006/0151775 A1 | 7/2006 | Hollenberg et al. |
| 2006/0238867 A1 | 10/2006 | Takeda et al. |
| 2006/0257090 A1 | 11/2006 | Podolskiy et al. |
| 2006/0262398 A1 | 11/2006 | Sangu et al. |
| 2006/0268216 A1 | 11/2006 | Song |
| 2006/0274218 A1 | 12/2006 | Xue |
| 2007/0070276 A1 | 3/2007 | Tan et al. |
| 2007/0121034 A1 | 5/2007 | Ouderkirk et al. |
| 2007/0215843 A1 | 9/2007 | Soukoulis et al. |
| 2007/0279727 A1 | 12/2007 | Ghandi et al. |
| 2008/0008857 A1 | 1/2008 | Kalkanoglu et al. |
| 2008/0013174 A1 | 1/2008 | Allen et al. |
| 2008/0061222 A1 | 3/2008 | Powers et al. |
| 2008/0117500 A1 | 5/2008 | Narendran et al. |
| 2008/0138543 A1 | 6/2008 | Hoshino et al. |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon et al. |
| 2008/0259254 A1 | 10/2008 | Kikuchi et al. |
| 2009/0015902 A1 | 1/2009 | Powers et al. |
| 2009/0040132 A1 | 2/2009 | Sridhar et al. |
| 2009/0059406 A1 | 3/2009 | Powers et al. |
| 2009/0128893 A1 | 5/2009 | McCarthy et al. |
| 2009/0128907 A1 | 5/2009 | Takahashi et al. |
| 2009/0167971 A1 | 7/2009 | Powers et al. |
| 2009/0219603 A1 | 9/2009 | Xue |
| 2009/0266394 A1 | 10/2009 | Tsubone |
| 2009/0268273 A1 | 10/2009 | Powers et al. |
| 2009/0296190 A1 | 12/2009 | Anderson et al. |
| 2010/0001008 A1 | 1/2010 | McCarthy et al. |
| 2010/0015363 A1 | 1/2010 | Chiang et al. |
| 2010/0027099 A1 | 2/2010 | McCarthy et al. |
| 2010/0045924 A1 | 2/2010 | Powers et al. |
| 2010/0051898 A1 | 3/2010 | Kim, II et al. |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0044061 A1 | 2/2011 | Santoro et al. |
| 2011/0102878 A1 | 5/2011 | McCarthy et al. |
| 2011/0205650 A1 | 8/2011 | Powers et al. |
| 2011/0216254 A1 | 9/2011 | McCarthy et al. |
| 2012/0140311 A1 | 6/2012 | Powers et al. |
| 2012/0262773 A1 | 10/2012 | Powers |

FOREIGN PATENT DOCUMENTS

| | | |
|---|---|---|
| CN | 1350648 A | 5/2002 |
| CN | 1494091 A | 5/2004 |
| EP | 1162496 A1 | 12/2001 |
| GB | 2261989 A | 6/1993 |
| JP | 49-094145 | 6/1974 |
| JP | 58-010717 A | 1/1983 |
| JP | 59-231516 | 12/1984 |
| JP | 61-223719 A | 10/1986 |
| JP | 01-178517 A | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002520677 | 7/2002 |
| JP | 2002357815 | 12/2002 |
| JP | 2003248204 | 9/2003 |
| JP | 2004004795 | 1/2004 |
| JP | 2004012818 | 1/2004 |
| JP | 2004291345 | 10/2004 |
| JP | 2005250119 | 9/2005 |
| JP | 2008530766 | 8/2006 |
| JP | 2006243485 | 9/2006 |
| JP | 2006285242 A | 10/2006 |
| JP | 2007515661 A | 6/2007 |
| JP | 2007272016 | 10/2007 |
| KR | 10-20020044153 A | 6/2002 |
| KR | 10-20030072578 | 9/2003 |
| KR | 10-20040048916 A | 6/2004 |
| KR | 10-20040108816 | 12/2004 |
| KR | 10-20060000059 A | 1/2006 |
| KR | 10-20070091314 A | 9/2007 |
| KR | 10-20100039401 A | 4/2010 |
| WO | 9402313 A1 | 2/1994 |
| WO | 9701789 A2 | 1/1997 |
| WO | 0123173 A1 | 4/2001 |
| WO | 02064937 A1 | 8/2002 |
| WO | 03029885 A1 | 4/2003 |
| WO | 03096105 A1 | 11/2003 |
| WO | 2005031437 A1 | 4/2005 |
| WO | 2006023195 A2 | 3/2006 |
| WO | 2006088369 A2 | 8/2006 |

(56) References Cited

FOREIGN PATENT DOCUMENTS

| WO | 2008092038 A1 | 7/2008 |
|---|---|---|
| WO | 2008106596 A1 | 9/2008 |
| WO | 2008144217 A1 | 11/2008 |

OTHER PUBLICATIONS

Fan, et al., "Thin-film conducting microgrids as transparent heat mirrors", Appl. Phys. Lett. (Apr. 5, 1976), 28(8):440-442.
Fedotov, et al., "Asymmetric propagation of electromagnetic waves through a planar chiral structure", The American Physical Society, PRL 97 (Oct. 20, 2006), 167401-1 to 167401-4.
Ginley, et al., "Transparent conducting oxides", MRS Bulletin (Aug. 2000), 15-18.
Goldhaber-Gordon, et al., "Overview of nanoelectronic devices", Proceedings of the IEEE (Apr. 1997), 85(4):521-533.
Lan, et al., "Survey on roller-type nanimprint lithography (RNIL) process", International conference on smart manufacturing application in KINTEX, Gyeonggi-do, Korea (Apr. 2008), 371-376.
Leatherdale, et al., "Photoconductivity in CdSe quantum dot solids", Physical Review B (Jul. 15, 2000), 62(4):2669-2680.
Manea, et al., "Optical characterization of SnO2 thin films prepared by sol gel method, for 'honeycomb' textured silicon solar cells", International semiconductor conference (Sep. 2006), 1:179-182.
Manea, et al., "SnO2 thin films prepared by sol gel method for 'honeycomb' textured silicon solar cells", Romanian Journal of Information Science and Technology 2007) 10(1):25-33.
Rogacheva, et al., "Giant gyrotrophy due to electromagnetic-field coupling in a bilayered chiral structure", Physical Review Letters (Oct. 27, 2006) 97(177401), 4 pages.
Sung, et al., "Dynamics of photochemical phase transition of guest/host liquid crystals with an Azobenzene derivative as a photoresponsive chromophore", Chemistry of Materials (2002), 14(1):385-391.
West, et al., "Characterization of polymer dispersed liquid-crystal shutters by ultraviolet/visible and Infrared absorption spectroscopy", J. Appl. Phys. 70 (7); 1991 American Institute of Physics, Oct. 1, 1991, 3785-3790.
Yamazaki, et al., "Polarisation-insensitive parametric wavelength conversion without tunable filters for converted light extraction", Electronic Letters (Mar. 16, 2006), 42(6):365-367.
Restriction Requirement dated Jun. 2, 2011 for U.S. Appl. No. 12/545,051 6 pages.
Response to Restriction Requirement dated Jul. 28, 2011 for U.S. Appl. No. 12/545,051 9 pages.
Non-Final Office Action dated Sep. 26, 2011 for U.S. Appl. No. 12/545,051 19 pages.
Response to Non-Final Office Action dated Mar. 25, 2012 for U.S. Appl. No. 12/545,051 17 pages.
Final Office Action dated May 11, 2012 for U.S. Appl. No. 12/545,051 __ pages.
Amendment & Response to Final Office Action with RCE dated Aug. 13, 2012 for U.S. Appl. No. 12/545,051 24 pages.
Notice of Allowance dated Dec. 19, 2012 for U.S. Appl. No. 12/545,051 10 pages.
Request for Continued Examination dated Mar. 19, 2013 for U.S. Appl. No. 12/545,051 2 pages.
Notice of Allowance dated May 10, 2013 for U.S. Appl. No. 12/545,051 10 pages.
Request for Continued Examination dated Aug. 12, 2013 for U.S. Appl. No. 12/545,051 3 pages.
Notice of Allowance dated Sep. 16, 2013 for U.S. Appl. No. 12/545,051 13 pages.
Supplemental European Search Report dated Feb. 26, 2013 for European Application No. EP09808848.7 7 pages.
EPO Communications per Rules 70(2) & 70a(2) dated Mar. 15, 2013 for European Application No. EP09808848.7 1 page.
PCT International Search Report & Written Opinion dated Mar. 31, 2010 for International Application No. PCT/US2009/054551 11 pages.
Patent Examination Report #1 dated Oct. 31, 2011 for Australian Application No. AU2009282812 2 pages.
Response to Patent Examination Report #1 dated Jan. 29, 2013 for Australian Application No. AU2009282812 33 pages.
Notice of Acceptance dated Feb. 8, 2013 for Australian Application No. AU2009282812 1 page.
First Office Action dated May 29, 2012 for Canadian Application No. CA2737041 3 pages.
Response to First Office Action completed Nov. 20, 2012 for Canadian Application No. CA2737041 48 pages.
Notice of Allowance dated Jan. 7, 2013 for Canadian Application No. CA2737041 1 page.
Amendment after Allowance dated Jul. 3, 2013 for Canadian Application No. CA2737041 49 pages.
First Office Action dated May 30, 2012 for Chinese Application No. CN200980141677.4 7 pages.
Response to First Office Action dated Nov. 28, 2012 for Chinese Application No. CN200980141677.4 15 pages.
Notice of Allowance dated Mar. 4, 2013 for Chinese Application No. CN200980141677.4 4 pages.
First Office Action dated May 29, 2012 for Korean Application No. KR10-2011-7006320 4 pages.
Response to First Office Action dated Nov. 29, 2012 for Korean Application No. KR10-2011-7006320 22 pages.
Notice of Final Rejection dated Apr. 19, 2013 for Korean Application No. KR10-2011-7006320 6 pages.
Response to Final Rejection dated Jul. 22, 2013 for Korean Application No. KR10-2011-7006320 13 pages.

* cited by examiner

METHODS FOR FABRICATING THERMOCHROMIC FILTERS

CROSS REFERENCE TO RELATED APPLICATIONS

This application is a continuation application of U.S. patent application Ser. No. 12/545,051 entitled "Methods for fabricating thermochromic filters" filed 20 Aug. 2009, which claims priority pursuant to 35 U.S.C. §119(e) to the following: U.S. provisional patent application No. 61/157,086 entitled "Methods for fabricating, sizing, transporting, and installing thermochromic filters" filed 3 Mar. 2009; U.S. provisional patent application No. 61/105,351 entitled "Methods for fabricating, sizing, transporting, and installing thermochromic filters" filed 14 Oct. 2008; U.S. provisional patent application No. 61/096,042 entitled "Methods for fabricating, sizing, transporting, and installing thermochromic filters" filed 11 Sep. 2008; U.S. provisional patent application No. 61/094,348 entitled "Methods for fabricating, sizing, transporting, and installing thermochromic filters" filed 4 Sep. 2008; and U.S. provisional patent No. 61/090,567 entitled "Methods for fabricating, sizing, transporting, and installing thermochromic filters" filed 20 Aug. 2008, and the disclosures of each are hereby incorporated herein by reference in their entirety.

This application is also related to U.S. patent application Ser. No. 12/172,156 entitled "Thermally switched reflective optical shutter" filed 11 Jul. 2008; U.S. patent application Ser. No. 12/340,552 entitled "Thermally switched absorptive window shutter" filed 19 Dec. 2008; and U.S. patent application Ser. No. 12/019,602 entitled "Thermally switched optical downconverting filter" filed 24 Jan. 2008, and the disclosures of each are hereby incorporated herein by reference in their entirety.

BACKGROUND

1. Technical Field

The subject matter described herein relates to the fabrication of devices for controlling the flow of light and radiant heat through selective reflection, transmission, and/or absorption and re-emission. The technology has particular, but not exclusive, application in passive or active light-regulating and temperature-regulating films, materials and devices, especially as construction materials.

2. Description of the Related Art

The problem of controlling the flow of radiant energy, e.g., light and heat, in particular in applications such as regulating solar heat gain in buildings and in other applications has previously been addressed using many optical methodologies. Photodarkening materials have been used for decades, for example, in sunglass lenses, to selectively attenuate incoming light when stimulated by ultraviolet (UV) radiation. When incorporated into windows, such materials can be used to regulate the internal temperature of a structure by darkening to attenuate bright sunlight, and by becoming transparent again to allow artificial light or diffuse daylight to pass through unimpeded. Such systems are passive and self-regulating, requiring no external signal other than ambient UV light in order to operate. However, because they are controlled by UV light rather than by temperature, such systems are of limited utility in temperature-regulating applications. For example, they may block wanted sunlight in cold weather as well as unwanted sunlight in hot weather.

Wire-grid polarizers (WGPs), which reflect infrared light rather than absorbing it, have been used since the 1960s and are described for example in U.S. Pat. No. 4,512,638 to Sriram, et al. With the advent of nanoscale lithography in the 1990s and 2000s, it became possible, though expensive, to produce broadband, wire-grid polarizers that reflect in visible and ultraviolet wavelengths, for use with high-end optics and laser technology as described, for example, in U.S. Pat. No. 6,122,103 to Perkins, et al.

More recently, low-cost reflective polarizer films combining the properties of a layered-polymer distributed Bragg reflector (DBR) with a stretched-polymer polarizer have been introduced. Such reflective polarizers are used in video displays to enhance brightness by reflecting the attenuated light back into the device rather than absorbing it as described, for example, in U.S. Pat. No. 7,038,745 to Weber, et al. and U.S. Pat. No. 6,099,758 to Verrall, et al. Such reflective polarizers can exhibit specular reflection for one polarization of light, as in a mirror, or diffuse reflection for one polarization of light, as in a coating of white paint, or a combination of the two. These films were developed specifically for the video display market and have not been used outside of it.

In addition, reflective polarizers can be made from certain types of liquid crystals. Whereas wire-grid polarizers and stretched polymer polarizers are linearly polarizing, these liquid crystal polarizers (LCPs) are generally circularly polarizing. Thus, light of one helicity (i.e., right- or left-handed) is transmitted and light of the opposite helicity is reflected.

Thermal switches allow the passage of heat energy in their ON or closed state, but prevent it in their OFF or open state. Many of these switches are mechanical relays, which rely on contact between two conducting surfaces (typically made of metal) to enable the passage of heat. When the two surfaces are withdrawn, heat energy is unable to conduct between them except through the air gap. If the device is placed in vacuum, heat conduction is prevented entirely in the open state. Another type of thermal switch involves pumping a gas or liquid into or out of a chamber. When the chamber is full, it conducts heat. When empty, there is no conduction, although radiative transfer across the chamber may still occur.

Light can be blocked by optical filters which absorb or reflect certain frequencies of light while allowing others to pass through, thus acting like an optical switch. Also, the addition of a mechanical shutter can turn an otherwise transparent material—including a filter—into an optical switch. When the shutter is open, light passes through easily. When the shutter is closed, no light passes. If the mechanical shutter is replaced with an electrodarkening material such as a liquid crystal display (e.g., a twisted nematic liquid crystal display), then the switch is "nearly solid state," with no moving parts except photons, electrons, and the liquid crystal molecules themselves. Other electrodarkening materials, described for example in U.S. Pat. No. 7,099,062 to Azens, et al., can serve a similar function. These optical filter/switch combinations are not passive, but must be operated by external signals, e.g., electrical signals.

Switchable mirrors are based on reversible metal hydride and metal lithide chemistry, described for example in U.S. Pat. No. 7,042,615 to Richardson. These switchable mirrors rely on the physical migration of ions across a barrier under the influence of an electric field and therefore have limited switching speeds and cycle lifetimes. In addition, electrically operated "light valves" combine liquid crystals with one or more reflective polarizers as described, for example, in U.S. Pat. No. 6,486,997 to Bruzzone, et al. In these devices, the liquid crystal typically serves as an electrotropic depolarizer, i.e., as a structure that changes or switches the rotation of the polarity of the light that passes through it on and off under the influence of an electric field. Some of these devices may be thought of as switchable mirrors, although they are rarely described that way, since their primary application is in video displays and advanced optics.

The information included in this Background section of the specification, including any references cited herein and any description or discussion thereof, is included for technical reference purposes only and is not to be regarded as subject matter by which the scope of the invention is to be bound.

SUMMARY

In U.S. patent application Ser. No. 12/172,156 by Powers et al., a thermoreflective filter composed of a low-clearing-point liquid crystal sandwiched between two reflective polarizers is disclosed, which has particular but not exclusive application as a component of building materials, e.g., a window film. Similarly, in U.S. patent application Ser. No. 12/340,552 by Powers et al., a thermodarkening filter composed of a low-clearing-point liquid crystal sandwiched between two absorptive polarizers is disclosed, which has particular but not exclusive application as a component of building materials, e.g., a window film.

Several thermochromic optical filters (e.g., thermochromic window filters) constructed using liquid crystals have been described previously. For the purposes of this document, the term "thermochromic" means a material that varies in absorption, reflection, diffusion, transmission, and/or fluorescence at one or more wavelengths in response to temperature change. There are multiple modes of operation of such filters, including filters that operate using either a thermotropic depolarizer (i.e. temperature dependent wave-block) between two polarizers or thermotropic distributed Bragg reflector (e.g., a distributed Bragg reflector where the index of refraction of one or more LC layers or regions changes with the state of the liquid crystal).

Flexible distributed Bragg reflectors based on materials such as plastics and other polymers (collectively "polymers") exist, as do flexible polarizers based on such materials. In particular, reflective polarizers based on stretched distributed Bragg reflectors, such as 3M DBEF and DRPF (which is a diffusive reflective polarizer) are available.

Thermotropic distributed Bragg reflectors and thermotropic polarizers based on distributed Bragg reflectors have previously been described. These devices, as well as the previously described liquid-crystal-based thermochromic filters and other such devices, may utilize liquids, gases, liquid crystals, and other materials which must be contained inside the devices for proper operation. The fabrication, sizing (including cutting and sealing) transportation, and installation these filters (and devices) therefore present many challenges which must be addressed.

Thus, there are many types of thermochromic and electrochromic devices made of alternating layers of (or regions of) liquids, solids, gases, polymers, plastics, metals, and other material. In particular, making these devices or "filters" flexible, light, robust (e.g. resistant to shear, flexion, tearing, creasing, heat, and humidity), improves them by making them easy and inexpensive to transport and install. Making them so that they can be sized (e.g. cut to any size and sealed) reduces manufacturing, transport, and installation costs. Making them so that they are light, robust, and easily adhered to surfaces makes them both easy and inexpensive to install, and increases the market for retrofit applications.

The manufacturing methods for many electrochromic (i.e., activated via electricity and control system) window filters is limited by the fact that these filters are not light, robust, flexible, and easily sized. A typical fabrication method for these filters is to manufacture them to a fixed size out of glass or plastic, transport the resulting (possibly fragile or heavy) electrochromic filter to an insulating glass unit (IGU) fabrication facility where they are adhered an IGU after connecting the necessary electronics through the IGU and to the electrochromic filter. Many types of electrochromic window filters are based on variants of LCD technology.

The "bottles" of liquid crystal displays (and thus various window filters), which hold liquid crystals between solid, transparent sheets coated first with conductive materials and then alignment layer polymers, are often made from materials that offer limitedly flexibility at best (e.g., glass), but displays have also been made of plastics and other more flexible materials. These electrochromic devices function by locally "turning on and off" a liquid crystal wave block using electric fields.

Devices utilizing the temperature dependent index of refraction of liquid crystals and other materials, especially as components of distributed Bragg reflectors and polarizers based on similar effects, have been previously described. The technology disclosed herein is directed to making such devices—as well as thermochromic and electrochromic devices—flexible, robust, light, and sizable by combining these components into one or more flexible layers, substrates, or similar organizations, with robust and/or flexible connections between them.

Devices have been described that exercised temperature-based control over the transmissivity of a window or similar material or structure with regard to radiant energy (e.g., visible, UV, and infrared light), including the entire range of the solar spectrum, for the purpose of regulating the flow of heat into a structure based on external weather conditions, internal temperature, or any combination of the two. This technology may be employed as a device having a temperature-responsive optical depolarizer (for example, a thermotropic liquid crystal) sandwiched between two polarizing filters to regulate the passage of light energy. The incident energies passing through this device will depend on the reflection and absorption efficiencies of the polarizers used. For example, some polarizers are very efficient at reflecting radiant energy over the frequency bandwidths of interest. Using such polarizers, up to half of the incident radiant energy passes through the device when it is below a threshold temperature and up to 100% of the incident radiant energy may be reflected away from the device above the threshold temperature, yielding a thermally switched reflective optical shutter (hereinafter "TSROS" or "shutter" or generically as a type of "filter"). Lower efficiency polarizers, or polarizers with frequency-dependent efficiencies, may be used to affect percentages of reflection above and below the threshold temperatures that are desirable for aesthetics, energy management, or other reasons. This effect can also be reversed such that the TSROS device is reflective in its cold state, or expanded such that the transmissivity of the TSROS is higher in the transparent state, or retarded such that the reflectivity of the TSROS device is lower in the reflective state.

The design of such devices may include two reflective polarizing filters which transmit light of a polarization parallel to their own, and reflect (not absorb) light of a perpendicular polarization are arranged in succession. When the reflective polarizers are oriented in parallel, up to 50% of the incoming radiant energy may be reflected. In practice, a small amount is also absorbed, so that typically, the light transmission through two parallel polarizers is 30-40%. When the reflective polarizers are oriented perpendicular to one another, up to 50% of the light is blocked at one polarizer and up to the remaining 50% transmitted by the first reflective polarizer is blocked by the second reflective polarizer. In this case, transmission of light through both reflective polarizers is very small (often less than 1%) and the majority of the light (often close to 100%) is reflected back in the direction of incidence.

Typically, a switchable depolarizer, which changes the polarization of the light passing through it, is also configured in conjunction with the two (or more) polarizers. In one embodiment, the switchable polarizer may be a liquid crystal sandwiched between two sheets of transparent, micro-textured material such as polymer-coated glass. The switchable depolarizer may be specifically selected or designed to be thermochromic, its polarization state shifts at a predetermined temperature. In the "off" state, the polarization state of incoming light is largely unaffected by the depolarizer, and in the "on" state, light of a particular polarization, having passed through the first polarizer, is rotated by a set amount. This is typically done to align the light with the second polarizer, either in a parallel or perpendicular state depending on the desired optical effect. Thus, the combination of two reflective polarizing filters and a liquid crystal forms a switchable mirror that reflects either up to 50% or up to 100% of the incoming light, depending on the state of the liquid crystal. An analogous effect can be achieved with absorptive polarizers, absorbing (rather than reflecting) up to 50% and up to 100% of incident light.

In another implementation of a thermochromic or thermotropic liquid crystal filter, a thermoreflective filter is used to increase the theoretical maximum "throw," which is the percentage change on transmission of light that is possible for the device as a light valve. In thermochromic or thermotropic LC devices, the presence of polarizers generally limits the throw to 50%. In one exemplary polarizer-free thermoreflective filter (as described for example in U.S. patent application Ser. No. 12/019,602 by Powers et. al.), a thermochromic distributed Bragg reflector is created by alternating LC and polymer layers or encapsulating LC in polymer layers. By matching the optical index of the nematic phase of the LC to that of the polymer, the resulting material is very transmissive. But when the LC in the filter goes isotropic, the optical index of the LC changes and there is an optical mismatch between the polymer and the LC, and the filter becomes a (usually diffusive) distributed Bragg reflector. This is a thermotropic light valve analogous to electrochromic, polymer-dispersed, liquid crystal devices.

Other possible implementations of thermochromic filters that may or may not utilize polarizers are thermochromic devices and/or light valves including, but not limited to, the following: thermochromic chiral, thermochromic Piezkov, thermochromic guest-host, thermochromic polymer stabilized liquid crystal, thermochromic ferroelectric, thermochromic polymer stabilized liquid crystals including thermochromic twisted nematic LC, thermochromic supertwisted nematic, thermochromic bistable twisted nematic, thermochromic dichromic dyed guest-host material, thermochromic bistable cholesteric cell, thermochromic cholesteric liquid crystals, thermochromic reflective cholesteric liquid crystals, thermochromic active matrix/thermochromic TFT, thermochromic Pi-cell, thermochromic in-plane switching, thermochromic vertically aligned, thermochromic polymer-stabilized cholesteric texture, thermochromic polymer network liquid crystal, thermochromic sheared polymer network liquid crystal, thermochromic sheared polymer dispersed liquid crystal, thermochromic sheared cholesteric liquid crystal, thermochromic stressed liquid crystal, thermochromic anisotropic gel liquid crystal, and other thermochromic LC light valves. All of these devices can be utilized with electrochromic overrides. This list is not meant to be limiting either in type of thermochromic LC devices or in the phase transitions used to achieve these effect, and many other versions of standard LC filters using melting/nematic, nematic/isotropic, or other phase changes are possible.

This application describes various methods for fabricating, sizing, transporting, and installing thermochromic optical and near infrared filters (e.g. thermochromic window filters, including thermoreflective window filters). Thermochromic filters can be fashioned in a variety of formats, including rigid structures that can be laminated to a sheet of glass. However, for use in industries such as glass panel manufacturing, the ideal thermochromic filter should be robust, light, flexible, able to be cut to any size and shape, and easily transported and installed. This makes it possible for example to manufacture the filters in one standard size in a central location (e.g., a large sheet or roll), to trim them to an appropriate size before or after shipping them safely and inexpensively to other locations, and to conveniently install them in both pre-fit and retro-fit applications.

It is possible to construct alignment layers in flexible polarizers made of materials such as polymers, such as 3M DRPF, through "scratching," "rubbing," or micro/nano-patterning. Alternatively, a layer may be placed on the inside of the "bottle" that is a superior surface for alignment layers, having properties such as a desired pre-tilt angle. In electrochromic applications, the thickness of the alignment layer may be critical since it is between the conductive layer and the liquid crystal and thus may affect the switching speed of a display. However, in thermochromic and thermoreflective filters, the conductive layer may be omitted. It is thus possible to make the "bottle" using the "inside" surfaces of flexible polarizers as the alignment layers, and the resulting bottle will be robust, flexible, and light. Similarly, it is possible to make bottles and alignment layers out of polymer sheets that are not polarizers. If a separate optional alignment layer is added, the alignment layer material may be chosen to maximize the chemical stability of the LC, and as a barrier between the LC and other layers.

Spacing of the LC layer in LC devices is often created by utilizing glass or plastic "spacers" (of various shapes and sizes, but most often spherical beads) held between two rigid "plates" covered in layers of conductive material. In electrochromic liquid crystal (LC) devices, the spacing between the conductive layers is often critical for two reasons. The first is to provide a good electric field across the device. The second is that high contrast ratios are desirable in electrochromic displays, and the highest contrast ratios are achieved at certain thickness of a given LC fluid, the so-called first and second minima. However, because in thermochromic liquid crystal devices the electric field may be omitted, and the contrast ratios desired are relatively low, the thickness of the LC may be significantly less critical; in fact, the only critical determinant of the spacing or thickness may be ensuring that there is enough liquid crystal in the bottle in any one place such that it is thick enough to act as a wave block at the frequencies of light of interest. However, minimizing the amount, and therefore the cost, of liquid crystal used in such filters is also a goal of many possible spacing designs. Such designs may include using glass spacers to ensure adequate thickness and melting or adhering slightly larger polymer spacers into the sides of the bottle under pressure to limit the maximum volume of LC that can occupy the bottle.

These "bottles" can be loaded in common ways such as using capillary action under vacuum, in slightly less standard ways such as spraying the LC onto one of the sides of the bottle and then sealing the second side of the bottle to the first, or in uncommon ways such as pressure loading. However, perhaps the simplest way to load the LC is through the "slop and glop" method, i.e., dispensing the LC onto one film surface, lowering the other film over the top, and then pressing out the thick spots and/or air bubbles with a squeegee or other instrument. The bottles can then be gasketed, sealed, sized (e.g., cut and resealed), and plugged using a variety of methods including heat-sealing and glue gasketing, and can be installed (e.g., attached via adhesives) to many surfaces.

The methods of manufacturing flexible bottles, gaskets and plugs, spacers and tensioners, alignment layers, gaskets, and other structures for polarizer-based thermochromic devices, as well as cutting and resealing, as disclosed herein also apply to the manufacture transport, of polarizer-free thermochromic devices. This is similarly true for those methods for transporting, sizing, and installing such filters. Such integrated thermochromic liquid crystal devices are easier and less expensive to manufacture, and are easier to transport and install than such a filter manufactured using more traditional LC display methods.

DETAILED DESCRIPTION

Figure 1:
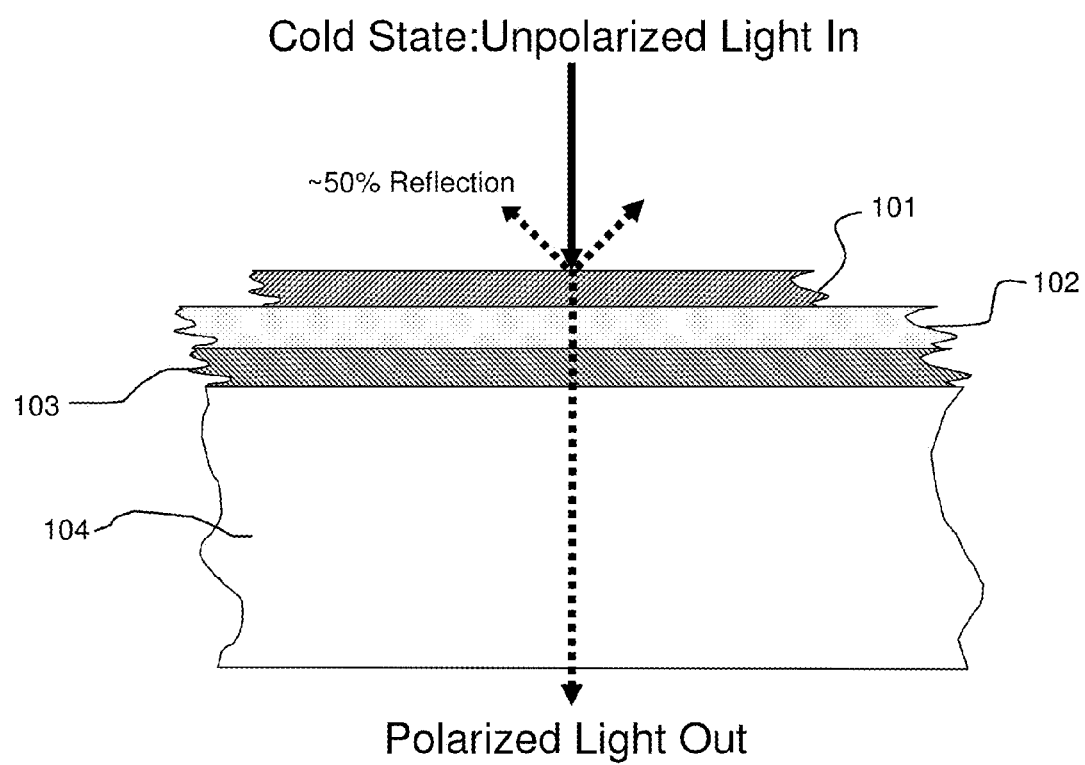
FIG. 1 is a schematic representation of a thermochromic (e.g., thermoreflective) filter laminated to a sheet of glass, in its cold or transparent state.

FIG. 1 is a schematic representation of a thermoreflective filter (laminated to a sheet of glass 104) in its cold or transparent state. When unpolarized light enters the device, it passes through the outer polarizer 101, where up to 50% of it is reflected because it is of perpendicular polarity to the polarizer 101. The remaining light, with the same polarity as the polarizer, is transmitted through into the twisted nematic liquid crystal layer 102, where its polarity is rotated by approximately 90 degrees. The light is therefore able to propagate through the inner polarizer 103, and thus approximately 50% of the incident light is able to pass through the glass substrate 104. Similar principles apply to thermoabsorptive/thermodarkening filters made from absorptive rather than reflective polarizers.

Figure 2:
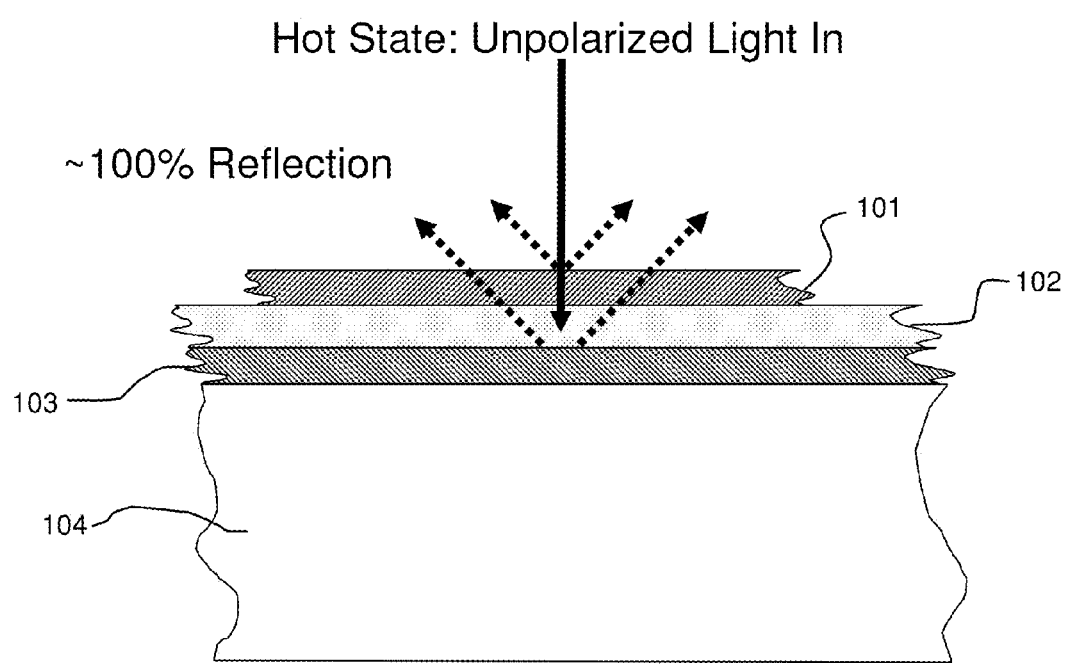
FIG. 2 is a schematic representation of a thermochromic (e.g., thermoreflective) filter laminated to a sheet of glass, in its hot or blocking state.

FIG. 2 is a schematic representation of a thermoreflective filter (laminated to a sheet of glass 104) in its hot or reflective state. When unpolarized light enters the device, it passes through the outer polarizer 101, where approximately 50% of it is reflected because it is of perpendicular polarity to the polarizer 101. The remaining light, with the same polarity as the polarizer, is transmitted through into the liquid crystal layer 102. However, because the liquid crystal is above its clearing point temperature, it is in an isotropic or disorganized state rather than an organized. The light is therefore reflected by the inner polarizer 103, which has a polarity perpendicular to that of the outer polarizer 101. Thus, very little of the incident light is able to pass through the glass substrate 104. Again, similar principles apply to thermoabsorptive/thermodarkening filters made from absorptive rather than reflective polarizers.

Figure 3:
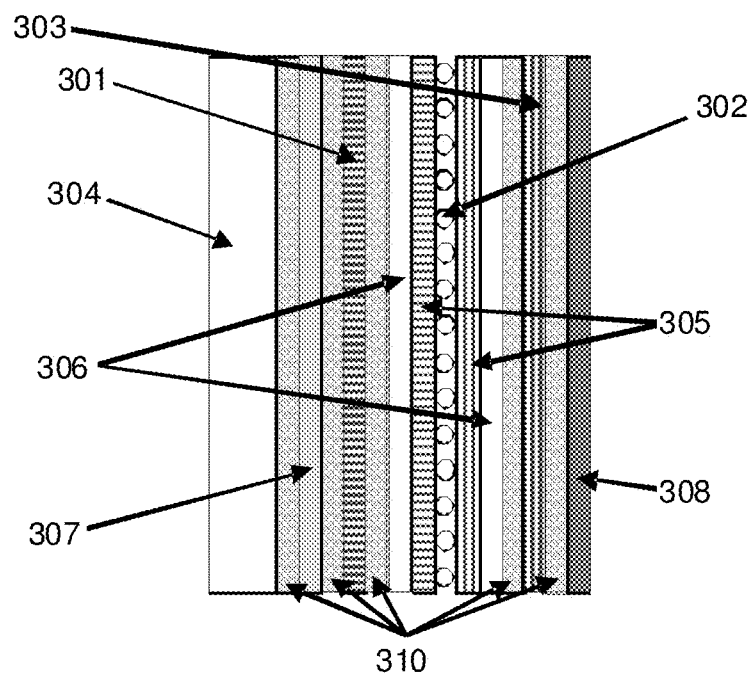
FIG. 3 is a cross-section view of a thermoreflective filter incorporating a twisted nematic liquid crystal cell or "bottle" made from sheets of rigid glass.

FIG. 3 is a cross-sectional view of an exemplary thermochromic (specifically, thermoreflective) filter incorporating a twisted nematic liquid crystal cell or "bottle" made from rigid glass. In this exemplary device, the glass windowpane 304 has fourteen layers added to it. First a UV-blocking film 307 is attached using a layer of adhesive 310 (e.g., a sheet of 3M 8211 optical adhesive). Next, the outer reflective polarizer 301 (e.g., a sheet of 3M DBEF polarizing film) is attached using another layer of adhesive 310'. Next, a sheet of thin glass 306 (e.g., 1 mm thick clear float glass) is added using a third layer of adhesive 310".

Next, a polymer alignment layer (e.g., a spray-coated film of polyimide or vinyl a few microns thick) is applied to the glass and textured (e.g., by rubbing with a piece of specialized rubbing cloth or with some other material, such as velvet, in a single direction) so that it is capable of aligning liquid crystal molecules such that they are parallel to the outer polarizer 301. Then, glass spacer beads 302 are added to form and support the space to be filled by liquid crystal, and a second sheet glass 306' bearing a rubbed polymer coating 305' is added in a perpendicular alignment, so it is capable of aligning liquid crystal molecules such that they are parallel to the inner polarizer 303. Next, the inner polarizer 303 is attached with another layer of adhesive 310'''. Finally, a low-emissivity film 308 is attached using a final layer of adhesive 310''''. The liquid crystal (not pictured) is then drawn into the space formed by the spacer beads 302, by capillary action or related methods, and the edges of the device are sealed using a heat-cured or UV-cured optical adhesive (e.g., Norlin 68 optical adhesive).

The layers in this exemplary device are generally adopted from the video display industry and were not specifically designed for use in thermochromic or thermoreflective window filters. Therefore, the standard method for laminating them is with a clear sheet adhesive such as 3M 88211 optical adhesive. As a result, the device involves fourteen separate layers, not including the glass substrate 304, and requires no fewer than 35 separate manufacturing steps to produce. In addition, the device is rigid, thin, fragile, and potentially very large, making it extremely difficult to handle or transport unless it is fabricated directly on top of a sheet of heavy glass (e.g., 6 mm tempered float glass) and encapsulated in an insulating glass unit (IGU), otherwise known as a double-paned window.

Thus, while this device offers a significant energy benefit when installed in buildings, it may be cumbersome to produce and ship. In an alternative implementation, methods for producing, sizing, and shipping flexible thermochromic (including thermoreflective) filters, developed specifically to overcome these difficulties, is described in the following figures.

Figure 4:
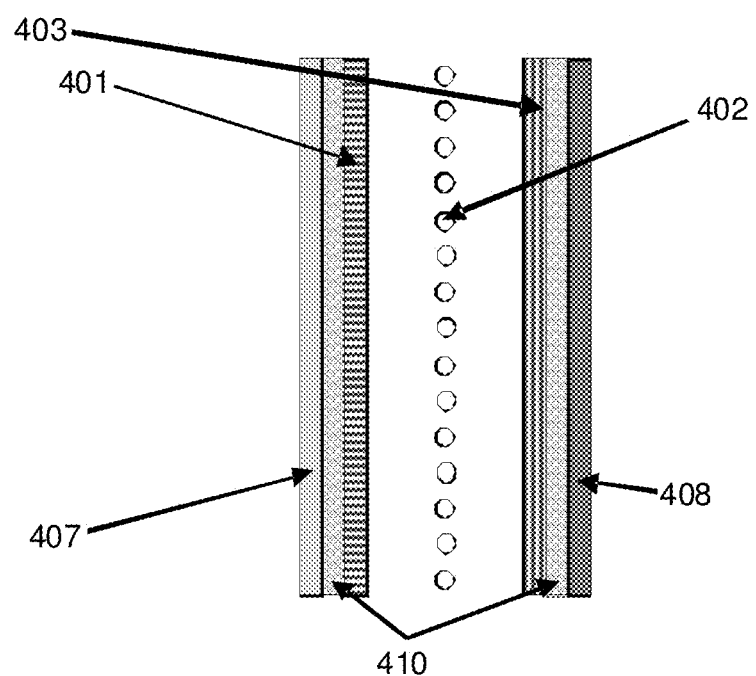
FIG. 4 is an exploded cross-section view of a thermochromic (e.g., thermoreflective) filter incorporating a twisted nematic liquid crystal cell made from the polarizing film itself.

FIG. 4 is a cross-sectional view (exploded for clarity) of an exemplary thermochromic (e.g., thermoreflective) filter incorporating a twisted nematic liquid crystal cell or "bottle" made from the polarizing film itself. This much simpler device requires only seven layers and does not need a glass substrate to hold it rigid to prevent damage, e.g., from flexing and cracking. In this exemplary device, the outer polarizer 401 and the inner polarizer 403 have been textured with a rubbing cloth so that they are capable of aligning liquid crystal molecules parallel to their own polarization. Thus, the thin glass layers 306 and 306' and the polymer alignment layer coatings 305 and 305' of FIG. 3 are eliminated, along with three layers of adhesive 305. To construct this device, the UV-blocking film 407 is laminated to the outer polarizer 401 with a layer of adhesive 410. Alternatively, the UV blocking capability may be within the adhesive itself, as is commonly the case with window film adhesives (e.g., Cytec GMS AX-4000-01 with Cyasorb 24). Next, spacer beads 402 are added to form a cavity for the liquid crystal (not pictured). Next, the inner polarizer 403 is added, and the low-emissivity film 408 is laminated to it using another layer of adhesive 410'. Finally, the liquid crystal is drawn into the space formed by the spacers 402, and the edges of the device are sealed.

In addition, the optical properties of the polarizers may be selected to produce or enhance certain optical effects. For example, the polarizers may have wide or narrow bandwidths, single or multiple bandwidths, may produce neutral or colored light, and/or may affect either visible light or invisible radiation such as UV and NIR. The polarizers may be reflective, absorptive, diffusive, or of some other distinctive character. In the case of absorptive polarizers, the filter may be capable of serving as both the downconverter and the thermochromic filter in a thermally-switched, optical downconverting device, for example, as described in U.S. Patent Application Publication No. 2008/0210893 to Powers et al.

Other variants on this embodiment are also possible and may be advantageous. For example, the spacer beads 402 may be mixed in with the liquid crystal and applied together via the "slop and glop" method as already described. Alternatively, the LC mixture, with or without the space beads included, may be doped with an adhesive or other polymer that can later be cured using heat, UV, visible light, or some other method. An advantage of this process is that it may make the liquid crystal more viscous and/or tend to adhere the spacer beads in place, preventing them from migrating, accumulating, or falling to the bottom edge of a filter held in a vertical orientation. At higher concentrations, such polymer or adhesive yields a polymer-stabilized liquid crystal (PDLC) or a polymer-stabilized twisted nematic (PSTN) or related structures including, but not limited to, polymer-stabilized cholesteric textured (PSTC) and polymer network LC, which may tend to adhere the two polarizing films together and/or prevent the liquid crystal from migrating. In the most extreme cases, this doping may yield a solid layer that behaves like a liquid crystal-based thermotropic waveblock, but that does not leak when cut (e.g., with scissors).

Figure 5:
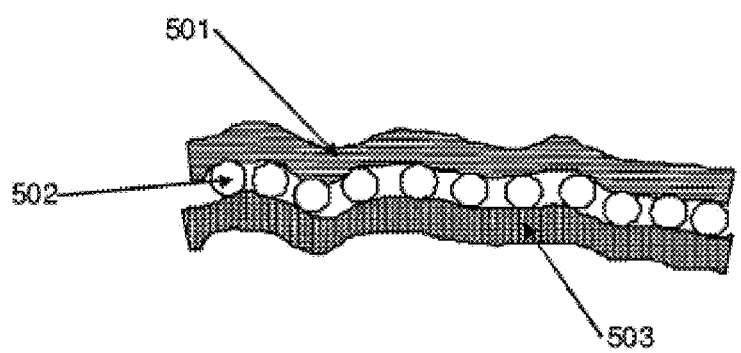
FIG. 5 is a cross-section view of a simpler embodiment in which optional layers have been removed.

FIG. 5 is a cutaway view of an even simpler embodiment of the thermochromic LC filter, wherein the UV-blocking film and low-emissivity film have been deleted, along with the adhesive layers used to laminate them. The device consists solely of the rubbed polarizing films 501 and 503, with a layer of spacer beads 502 creating a void into which the liquid crystal is loaded. The edges of the device are then sealed by any of a variety of methods, including adhesives, tapes, RF welding and heat sealing.

The spacer beads 502 may be made of glass or polymer, but a variety of other materials including metals and ceramics may also perform the same function. However, glass spacer beads are more likely than polymer spacer beads to damage a polymer film, particularly if the film is very thin or made from inelastic materials. In addition, the positions of glass spacer beads within the device are not constrained; i.e., the beads can roll around between the polarizing films, clump together, crowd to the edges, etc. Also, while glass spacers can preserve the optical properties of the device by preventing the two polarizing films from touching, or coming any closer to one another than the diameter of the beads, they cannot prevent the two polarizing films from moving farther apart, creating "baggy" regions where the liquid crystal is thicker than desired. In the extreme case, under the influence of gravity the device could even pull itself into a teardrop shape and essentially cease to function unless sufficient tension is maintained to hold it in the proper shape. These problems may be solved through the use of spacer beads that are heat-meltable, coated with adhesive, chemically functionalized to promote bonding, or that have a physical or molecular structure that encourages their adherence to the film by physical means including but not limited to suction, Van Der Waals forces, and mechanical hooking (as in a hook and loop fastener). For example, adhesive-type Sekisui micropearl LCD spacers perform very well in this function, although a variety of other spacer types could be used instead.

Alternatively, spacers and tensioners to join and separate the polarizing films may be produced directly on the films themselves through various surface imprint technologies, for example, by deposition or etching processes that leave the spacers and/or tensioners behind as posts or patterns. The forms to be deposited or etched may be defined lithographically including by, for example, but not limited to, nanoimprint lithography, photolighography, holography or interference lithography, nano-indentation lithography, and electron-beam lithography. Spacers and tensioners can also be formed by localized heating or photopolymerization of a surface (e.g., with a laser), or by chemical self-assembly (e.g., with block copolymers), or using chemicals such as Dow chemical cyclotene and photoimaging, or via inkjet printing, which are all considered forms of surface imprint technologies for the purposes of this disclosure. Tensioners hold the bottle together, just as spacers hold it apart, and the two can be combined into the same objects (as with an adhesive-type spacer bead).

The spacers in the bottle may be in the form of one or more of the following: spacers dissolved or suspended in the LC, spacers glued/adhered to just one side of the bottle, functional features of the bottle such as dimples, interconnections, knobs, mounds, or droplets made using adhesives; spacers melted into or sputtered onto the bottle; or seals in the bottle (or subsections of the bottle) closed with sufficient amounts of liquid crystal such that the volume of the liquid crystal itself holds the filter apart sufficiently. In this last configuration, a stiff edge seal may limit the ability of the filter to flex and displace liquid crystal. Alternatively, spacing may be achieved by mixing adhesives with the LC, loading the mixture with the sides of the bottle held at an appropriate distance, and curing the adhesive in processes similar to those used in polymer-dispersed liquid crystal displays. The spacing may additionally be created using inkjet printing of small features made of polymer or adhesives, by photolithography of materials such as cyclotene, or by imprint lithography. Encasing some of the liquid crystal in small spheres as "spacers" is also possible. These and similar methods for creating appropriate spacing in the bottle may not be acceptable, or even possible, in electrochromic applications but function well in thermochromic (e.g., thermoreflective) filters.

Because it is flexible, light, and durable, the filter can attached to windows, walls, doors (including garage doors), curtain wall frames, storefront frames, window frames, roofs, skylights, and automobiles, among many other possibilities. The filter may then be used to control solar heat gain, based on external temperature, for any and all of these applications.

Diffusively reflective polarizing versions of the filter, as well as IR only polarizers and absorptive polarizers, are suitable for application in areas which would otherwise not be ideal for reflective polarizer based filters, including roofs, skylights, curtain walls, and automobiles. Since the transmission of light through diffusively reflecting and transmitting polarizers is not specular, it is possible to use alignment and spacer technology that would be unsuitable (e.g., have large occlusions) in "window filter" type applications. The filter is thus a method for controlling solar heat gain on virtually any surface using the filter, including windows, walls, doors including garage doors, curtain wall frames, storefront frames, window frames, roofs, skylights, tents, and vehicles.

In one embodiment, the filter is formed using two pieces of a flexible reflective polarizer made of polymers (e.g. 3M DRPF or APF). The alignment layer is scratched or rubbed into one surface of the polymer polarizer. An effective alignment layer can be created using a coarse abrasive such as 600 grade sandpaper or a soft rubbing cloth (e.g., Yoshikawa Chemical Company YA-19R or YA-25-C brand rubbing cloth, or generic non-linting velvet from a fabric store), which produces far superior optical properties. The alignment layers are directed such they are at a 90 degree angle when the polarizer and analyzer are at 90 degree angle as well for maximum change in contrast in the "transmissive" (e.g. "cold") and "reflective" (e.g. "hot") states of the thermochromic filter, although many other configurations are possible. Glass and/or polymer spacers are deposited on the inner alignment surface of one of the polarizers, and then the "bottle" of the thermochromic LC filter is formed by sealing the edges of the two polarizers such that the alignment sides are toward each other, leaving one or more openings through which to load the LC. Such a seal is analogous to a gasket in electrochromic LC devices.

The thermotropic LC (which must have suitable freezing and isotropic transition points for the intended use) is then brought into contact with one or more of the openings, drawing the LC into the bottle using capillary action. This can be done under vacuum if desired. Once the bottle is "loaded," internal or external plugs may be used to seal the bottle. The thermotropic liquid crystal sandwiched between the two polarizing alignment layers functions as a depolarizer at low temperatures. When the thermotropic liquid crystal becomes an isotropic liquid layer at high temperatures, the "bottle" functions as a wave block. In combination with the polarizing effects of the "bottle", this structure is a thermochromic filter, which may be specular or diffusive depending on the components used.

The bottle and plugs can be sealed via heat, pressure, chemical means, various forms of radiation (including laser), and UV among other means. Pressure may be used in combination with heat to lower the temperatures, times, and other factors necessary to seal layers together. The bottle may further be subdivided by sealing it into small, compartmentalized sections for robustness. PET (Polyethylene terephthalate) "bottles" are suited to this operation as they are easily heat-sealed. If both glass and polymer spacers are used, interconnections of the filter may be achieved by compressing the filter while applying heat, radiation, or other means such that the glass spacers provide a constant spacing, while the polymer spacers attach themselves to the polarizers creating the interconnections. The resulting filters can be subdivided either by forming new gaskets by the processes discussed above and then trimming around the new gasket, or by simply trimming the filter around previously formed subdivisions. This forms a robust, flexible, and sizable filter, which can be covered with adhesive and a protective backing for both the adhesive and filter. The result is a filter which is light, robust, and conveniently and cost-effectively shipped. The filter may be sized and installed when received at another location. In this embodiment, the filter can be sized with a device designed to apply heat, pressure, chemicals, and/or internal/external gaskets to the bottle (e.g., a soldering iron or "heat sealing knife").

A flexible thermochromic filter comprising two polarizing films 501 and 503 separated by spacers 502 to maintain the cell gap for a liquid crystal material may be formed in a variety of ways. In one variant of this embodiment, the alignment layer may be formed using the nano-patterned aluminum wires of a flexible wire-grid polarizer embedded in a flexible polymer substrate such as PET.

In other variants, nano-imprint lithography or other lithographic patterning method (including, but not limited to, photolithography, holography or interference lithography, nanoindentation lithography, and e-beam lithography) may be used to create the alignment layers.

Alternatively, the alignment layer may be produced using chemical self-assembly (e.g., with block copolymers), by stretching of the polymers to produce aligning surface features, by inkjet printing, by forming photopolymers, or other comparable methods.

Additionally, materials which have properties suitable for alignment layers, such as pre-stretched polymers, may be used. In another variant, the alignment layers may be created in or on materials specifically chosen for their suitability, such as polyimides. Among many methods, these materials may be adhered or glued to, laminated to, or deposited on the polarizer layer or mediation layer.

In other variants of the present embodiment, the spacers may be formed using deformations of the bottle, or using the combination of sub-gaskets and/or interconnections and the volume of the liquid crystal. The sub gaskets or interconnections can be formed using heat, radiation, pressure, or other methods. In other variants of this embodiment, the thickness of the liquid crystal is limited to control optical properties and/or to control the amount of liquid crystal used. In still other variants, the alignment layer consists of or includes a layer and or structure designed to assist in the wetting and/or loading speed of the liquid crystal.

All of the variants thus described should be considered exemplary rather than limiting, as further permutations and combinations of elements may be used in their place without departing from the spirit of the embodiment.

Figure 6:
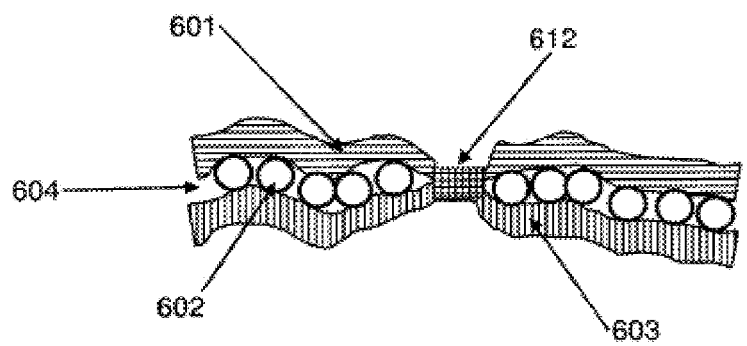
FIG. 6 is a cross-section view of a flexible thermochromic (e.g., thermoreflective) filter that has a welded seam produced by a heat sealer.

FIG. 6 is a cutaway view of an embodiment similar to the one shown in FIG. 5, except that the two polarizers 601 and 603 have been heat sealed or RF welded together, creating a welded seam 612. The device can now be cut in two—or cut into any number of pieces of any desired shape and size—by cutting along the welded seam or seams 612. The welded seam 612 forms a gasket which prevents the liquid crystal 604 material from leaking out. The materials used in the layers of this embodiment are chosen such that they can be sealed and cut using methods common to materials such as polymers, or reliably sealed using adhesives or glues, or chemically bonded. For example, the 3M DBEF reflective polarizing film may contain one or more of polyethylene terephalate (PET) or polycarbonate, a transparent, heat-sealable material which can easily be cut using scissors, knives, cutting wheels, or any number of other standard methods, and which does not contaminate the liquid crystal mixture when heated. The method for sealing this embodiment is quite simple, as a heat sealer or RF welder can press and seal the two polarizing films 601 and 603 together right through the liquid crystal layer 604. Spacer beads 602 and liquid crystal molecules 604 are either pushed aside or incorporated into the welded seam 612, without damage to either the liquid crystal 604 or the seam.

Thus, it is possible to produce, ship, and store the thermochromic or thermoreflective filter in large sheets or rolls, and then cut them to size as needed for incorporation into insulated glass units or other building materials.

Figure 7:
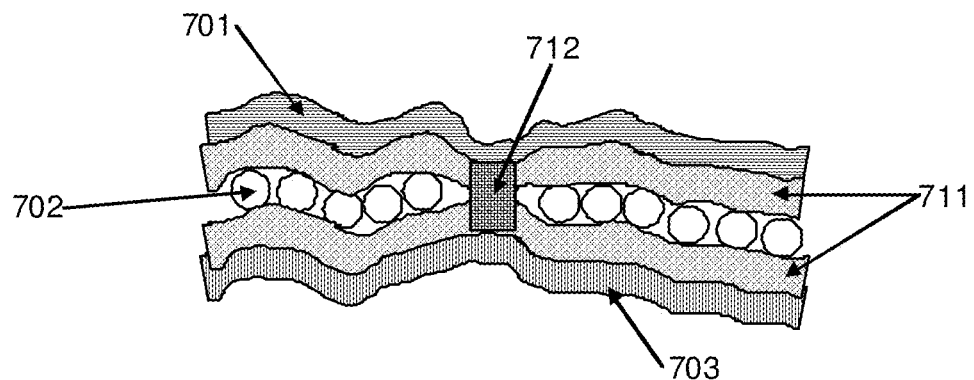
FIG. 7 is a cross-section view of a flexible thermochromic (e.g., thermoreflective) filter that has a welded seam produced by a heat sealer through the use of an additional, heat-sealable polymer layer.

FIG. 7 is a cutaway view of a similar embodiment wherein the polarizing films 701 and 703 are made from a non-heat-sealable material. For example, 3M's DRPF reflective polarizer films may contain polystyrene, a thermoset plastic that may deform, cross-link, additionally polymerize, harden, and degrade under heat and pressure rather than welding together and sealing. In this embodiment, a layer of additional, sealable polymer 711 has been bonded to the polarizers 701 and 703 such that the device can be welded, sealed, and cut as in the previous embodiment to create a welded seam 712. Space beads 702 and liquid crystal molecules are either pushed aside or incorporated into the welded seam 712, without damage to either the liquid crystal or the seam. The additional polymer layer 711 is specifically chosen for both its sealing properties and its optical properties (typically including colorlessness, high transparency, low birefringence, and low haze), such as Surlyn (a transparent low melting temperature material) or cellulose diacetate, among many other possibilities. There may be two heat-sealable layers that seal together, or there may be one layer that heat seals to the polymer or plastic of the other side of the "bottle". Such methods to allow for the filters to be cut to arbitrary sizes as well as the use of external devices such as "heat-sealing shears" make the process of cutting and sealing the filters portable. Additionally, it is possible to create external gaskets over the top of the heat seal using Kapton tape or other polymer tapes, Norlin 68 optical adhesive, or other similar sealers. Any of these methods can be thought of as ways to replace the "fixed" gaskets common to LC devices with gaskets that can be used to seal cut-down pieces of filter.

The materials used either for "gasket" seals and for spacing may be chosen so that they have optical properties such that they aid or reduce the total transmission of light. The filters may have an adhesive suitable for in-place application included, and there may be a backing or "release liner" or "release sheet" on the adhesive to prevent it from prematurely adhering. There may also be a protective layer to prevent scratching, bending, or other damage that is attached to one or both sides of the filter that can be removed before or after application. Numerous other permutations may be employed without departing from the spirit of the embodiment, which is a heat-sealable thermochromic filter made from non-heat-sealable polarizing films.

Figure 8:
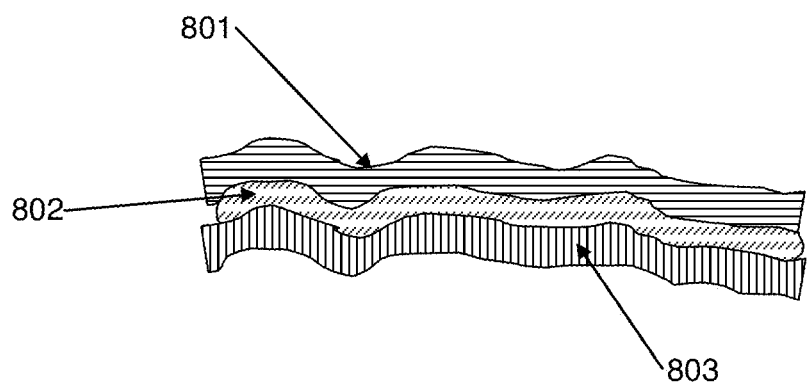
FIG. 8 is a cross-section view of a flexible thermochromic (e.g., thermoreflective) filter in which capillary action allows the liquid crystal to serve as both a spacer and tensioner between the polymer films.

FIG. 8 is a cross sectional view of a further embodiment, wherein the liquid crystal acts as its own spacer and tensioner, and the polarizing film acts as its own alignment layer. The first requirement to enable this property is that the polarizing films 801 and 803 must have a surface that is wettable by (i.e., not chemically repellant to) the liquid crystal 802. This wettability may be inherent in the polarizer materials themselves (as is the case with the vast majority of polymers) or may be applied as a surface treatment or bonded layer on the polarizing film. For example, the fluorinated polymer Teflon resists wetting by a wide variety of liquids and liquid crystals. However, a surface coating or bonded layer of a wettable polymer such as polyethylene renders the surface wettable.

The second requirement is that the surface of the polarizing films 801 and 803 must have nanoscale or microscale physical or chemical features that are capable of aligning the liquid crystal molecules. Ideally, such alignment will be parallel with the polarization axis of the polarizing film, although other orientations will also work. Fortunately, the manufacture of polymer-based polarizing films (both the absorptive and reflective variety) usually involves a stretching step to confer a preferred molecular orientation within the film. Even for films with very smooth surfaces, this alignment of the long-chain polymers that make up the film results in a functional alignment layer for the liquid crystal 802. In fact, most polymer films produced via any sort of reel-to-reel or web winding process have a "draw direction" that produces a similar effect, though less strongly.

When these conditions are present, the wettability of the surface creates a spreading force that attempts to pull the liquid crystal 802 outward in all directions until it covers the entire surface. This same effect can be seen, for example, when rain hits a sidewalk; the water spreads and wets the entire surface, rather than forming beads (as it would, for example, on a Teflon surface). At the same time, the surface tension of the liquid crystal 802 creates a force that attempts to pull the liquid together to form a bead or sphere. These forces act in opposite directions, so that in practical terms there is a minimum thickness for the resulting layer of liquid crystal 802 on top of the polarizing film 803 in order to achieve full wetting. Finally, when a second polarizing film is added and the liquid crystal 802 is sandwiched between the two polarizers 801 and 803, a capillary force comes into play that draws the two films 801 and 803 together. This effect can be seen, for example, when a drop of water is placed between two sheets of wettable film. The films will stick together, even though neither the films nor the water drop have any adhesive properties per se. And yet, because of the balancing of wetting forces and surface tension, the water is not pressed out from between the films, instead forming a layer of approximately uniform thickness between them. In fact, when an external pressure squeezes the liquid out of a particular region (as when the films are pressed between thumb and forefinger), the liquid quickly moves back into the formerly compressed area once the pressure is removed.

Thus, a liquid crystal 802 sandwiched between two polarizing films 801 and 803 is capable of forming a thin, relatively uniform layer that both prevents the two polarizers 801 and 803 from touching one another and also prevents them from pulling apart beyond a certain distance. In this case, the liquid crystal itself is acting as both spacer and tensioner. This effect is most pronounced when the films involved are fairly stiff. For extremely thin or flimsy films in a vertical orientation, there is a maximum size above which the force of gravity will overcome the wetting and capillary forces, and the liquid crystal 802 will tend to pool at the bottom.

There must be sufficient distance between the polarizers 801 and 803 that their aligning properties give enough room for the liquid crystal molecules to complete a 90° nematic twist (or any other desired amount of twist) across the gap from one aligning surface to the other. Thus, there is an optimal volume of liquid crystal per square centimeter such that the amount of liquid crystal is minimized but the desired nematic twist is achieved. Empirically, for a pure 6CB liquid crystal sandwiched between two 3M DRPF polarizers, this value appears to be approximately 0.086 milliliters per square centimeter, although we do not wish to be bound by this. In addition, for chiral-doped liquid crystal mixtures, there is an optimum amount of chiral additive (generally very small) that allows the liquid crystal to complete one and only one twist, or for superwisted cells, an optimum amount of chiral dopant that allows a particular number of twists to be completed across the cell gap to produce particular desired optical effects, such as Distributed Bragg Reflection (DBR) of a particular wavelength of light.

Because this embodiment incorporates fewer components, fewer manufacturing steps, and potentially less liquid crystal than other embodiments, it is highly desirable from an economic standpoint because it is likely the cheapest to manufacture. It is also likely to be more robust than any of the other embodiments listed herein, because it has fewer failure points and fewer self-interaction modes. Thermochromic and thermoreflective filters made by this method can be produced via a very simple web-winding process, heat sealed at the edges (e.g., with a heat sealer, sonic welder, RF welder, or even an implement as basic as a soldering iron), stored and transported on rolls, heat sealed into smaller units and cut to size, and installed on the inside or outside of IGUs or other building materials.

This embodiment can be hybridized with others. For example, it may be desirable to incorporate a small number of spacers to establish a minimum allowable cell gap, or a small number of tensioners to establish a maximum allowable cell gap, while largely retaining the self-organizing properties of wetting, surface tension, and capillary forces. For example, a small number of adhesive spacers (e.g., Sekisui Micropearl adhesive spacers) can be used as both spacers and tensioners to define the cell gap, while wetting, surface tension, and capillary forces do the "heavy lifting" of maintaining that cell gap once the liquid crystal is loaded in the cell.

In other embodiments, the spacing and/or interconnections are achieved using methods such as polymer stabilized liquid crystal mixtures, where polymers are mixed into the LC solution and are fixed to become either spacers, tensioners, or interconnections using heat, pressure, radiation, or other methods.

Figure 9:
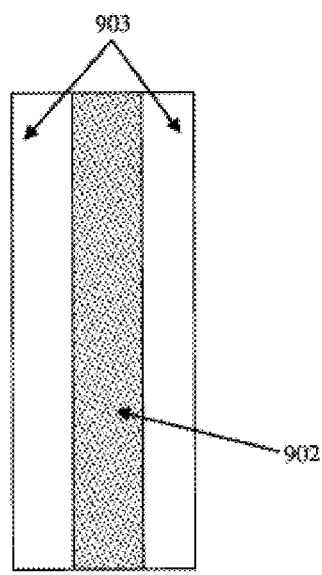
FIG. 9 is a cross-section view of a flexible thermochromic (e.g., thermoreflective) filter which does not use polarizers, e.g., utilizing a thermochromic distributed Bragg reflector constructed from polymer and liquid crystal.

FIG. 9 is a cross-section view of a further embodiment of a flexible thermochromic (e.g., thermoreflective) filter which does not use polarizers, but instead uses a thermochromic material constructed from polymer and liquid crystal 902 within a substrate material 903.

In one exemplary form of this embodiment, the thermochromic layer is a thermotropic distributed Bragg reflector. It is possible to construct thermochromic (e.g., thermoreflective) and/or thermotropic LC filters using polymer-dispersed, chiral, guest-host, and other LC filter variants that do not require polarizers to function. These thermochromic and/or thermotropic filters can use any of the possible phase transitions as their mode of operation (e.g., nematic to isotropic phase changes) as light valves. Thermoreflective filters, which become more reflective about a set transition temperature, can be constructed by mixing a photopolymer together with LC chosen for their optical indexes, using an electric field or other means to align the LC such that the optical index is well matched to the polymer in the desired optical direction, and photopolymerizing the polymer such that there are alternating layers or encapsulated regions of polymer and LC. In such a polymer-dispersive LC device, below the transition temperature the LC and polymer have well-matched optical indexes and therefore appear transparent, but in the isotropic phase of the LC a distributed Bragg reflector or scatterer is formed by the differences in refractive index.

One possible variant of this polarizer-free embodiment is to dope the liquid crystal with dye molecules (including nanorods and other "mechanical dyes"), and let the optical properties of the dye molecules at various orientations (i.e., where various states of the liquid crystal dictate the orientation of the dye molecules) determine the absorptivity, reflectivity, and/or diffusivity of the filter, rather than periodic changes in index of refraction. For example, where the dye molecules are suspended by, and their orientation constrained by, the LC such that they interact with very little light (e.g., the dye molecules are aligned perpendicular to the polymer sheet via a homeotropic alignment), the filter, largely transmits solar energy while in the organized cold/nematic state, but significantly blocks solar energy in the disorganized hot/isotropic state, where the apparent cross-sectional area of the dye molecules is much larger. For example, amphiphilics used as surface coupling agents on surfaces with strong polarity tend to give homeotropic alignment layers. Soap is an example of a substance that can perform this role, either as a surface treatment or as a dopant for the liquid crystal, that is drawn preferentially to the inner surface of the "bottle." When heated to an isotropic state, the dye (whether reflective, absorptive, or fluorescent) is oriented at all angles and thus blocks more light. This is the high transmission version, but is "darker" off of the normal axis, so that it may, for example, tend to limit summer sun while transmitting sunlight at lower angles (e.g., in winter).

In another exemplary form of this embodiment, the nematic liquid crystal may have a homogeneous (parallel to the polymer sheet) alignment. Dyes that interact more with light (either absorptively, fluorescently, or reflectively) and that molecularly align (usually along the long axis of the molecule) act as polarizers. For example, there are dyes that are more absorptive of light which is polarized along one axis (usually the long axis) of the molecule. Examples of this include the two classes of dyes: azos and anthraquinones, but there are many others. In this implementation, the LC and the dye are mixed together, and the LC holds the dye in place, as if it were also LC. This is sometimes described as the guest-host effect. When this mixture goes isotropic, the dye absorbs/fluoresces/reflects in all polarizations; if enough dye is included, then transmission is reduced by absorbing/fluorescing/reflecting more light. Dyes exist which exhibit dichroic ratios and order parameters desirable for thermotropic devices. There are polarization-specific types of dyes called positive dichroic dyes (pleochroics) and negative dichroic dyes, which absorb the E vector of light along the long molecular axis of the dye and perpendicular to the long molecular axis of the dye, respectively. Each of these polarization types effect the way the dye interacts with light for a given state of the liquid crystal and thus generate different thermochromic devices. Thermotropic devices that operate in ways analogous to electrochromic display devices such as White-Taylor mode, Heilmeier dichroic, quarter-wave dichroic, double cell guest-host dichroic, dye doped twisted nematic, supertwist dye effect, and polymer dispersed dichroic, among others, are possible.

Still another exemplary form of this embodiment uses a combination LC-dye structure. There are also aggregated dye liquid crystals, which are dyes that when solvated in certain materials (e.g., water) form LCs by aggregating into LCs. Such a solution has a nematic and isotropic range, with a "coexistence" range in-between, so it is possible to make it perform as both an LC and a polarization-specific dye. One example is the food coloring dye Sunset Yellow FCF, although its transition temperature or clearing point temperature may not be ideal for some applications. In the cold (nematic) state the molecules orient themselves just as dyes in LC are oriented, but the molecules then stop behaving as LCs when heated and only act as dyes.

However, there is a second mode of operation for this exemplary device. Research has shown that the order parameter (i.e., how well all the molecules line up on the director at any given moment) varies enough with temperature for some dyes and combinations of dyes that a phase transition is not needed to generate a thermochromic effect. In effect, the dye naturally becomes more absorptive as it gets hotter. These dyes are, in operation, like absorptive versions of the chiral and cholesteric referred to by Powers et al. in U.S. Patent Application Publication No. 2009/0167971. If multiple, chemically similar dyes are employed simultaneously, the effect may be very powerful as the device is capable of covering an extremely wide band of wavelengths.

In still another exemplary form of this embodiment, a fluorescent dye/liquid crystal mixture may be combined with band reflectors tuned to specified wavelenths—e.g., light of multiple wavelengths is downshifted to infra-red (IR) and then reflected out using an IR reflector such as distributed Bragg reflectors or low-e coatings, in a manner similar to that described by Powers et al. in U.S. Patent Application Publication No. 2009/0167971. Narrowband reflectors for the appropriate wavelengths may be inserted where light is re-emitted by the fluorescent dye. Such a device may be particularly effective if the dye or combination of dyes absorbs light across a broad range of wavelengths but emits light in a narrow range of wavelengths, such that the emissions can easily be reflected by a narrowband reflector while incident radiation is allowed to pass through. Quantum dot or rod particles are particularly suited to this role, although numerous other types of dyes will also work and may be advantageous.

Still another exemplary form of this embodiment is a parallel alignment device such as a twisted nematic (TN) or super-twisted nematic (STN) version of the standard "guest-host cell" liquid crystal device, using either one or two polarizers. This may allow the use of less dye or fewer kinds of dye, as the nematic twist of the LC can be used to make the device more or less absorptive as light is rotated, especially for smaller wavelengths. This arrangement is also ideal for augmenting one or two polarizer versions, and can improve polarization efficiency, off-axis performance, and color balance for two polarizer devices.

Still other exemplary forms of the embodiment are possible. For example, a thermochromic analog to the White-Taylor display may have a chiral LC material distributed between two polymer sheets with parallel alignment such that the LC rotates by a particular desired amount across the cell gap of the device, so that the absorptive dyes inside (i.e., dyes that are absorptive when aligned with the LC) are absorptive when nematic, and less so when isotropic. However, if a less absorptive dye "from the side" is used rather than "end-on", then the transition from cholesteric to isotropic could also be used to make a thermotropic film. Furthermore, if only a small rotation, e.g., 90 degrees is used, then the temperature dependence of the chiral LC would allow more or less light to pass through based on temperature even without using the isotropic transition. This is once again a hybrid device using a combination of related effects to achieve thermochromism.

In addition, it is generally recognized that electrochromic "Pi-cell" display cells exhibit better off-axis performance than TN or STN, resulting in fewer color anomalies and more consistent contrast ratios as the viewing angle is varied. A thermochronic film using dyes or reflectors in Pi-cells may have improved or altered off-axis performance, directionality, or other attributes. Pi-cells work on variable retardation of the light rather than on optical activity as in TNs, which is another exemplary thermochromic LC effect that can be exploited in the present embodiment.

Finally, convection cells may be used to make optically diffusive filters. Electrochromic devices do this by torquing LC molecules with an electric field, which can be done with nematics or smectics for different effects. However, a similar effect can be achieved through localized disorganization of the LC molecules due to thermal convection. This is a thermochromic analog of Williams domains wherein, due to electrically driven turbulence, the electricity creates a convective-like mode called the dynamic scattering mode (DSM), which is also a method of providing electrochromic override for difussive thermochromics. In DSM, the distortion of the director orientation of the LC focuses light with a polarization parallel to the director. Such turbulence may also be created via small absorptive lines and/or thickness variations within the LC cell, creating convection zones when the LC is in its isotropic state and is thermally excited resulting in random motion.

"Typical" liquid crystal molecules are not required to produce the above effects, because by many estimates roughly 40% of all molecules (potentially including small carbon nanotubes, metal nanorods, etc.) are capable of exhibiting liquid crystal states. There are also analogues to the dyes in nanotubes and there are metallotropic LCs (typically composed of both organic and inorganic molecules) whose LC transition depends not only on temperature and concentration, but also on the inorganic-organic composition ratio. These can be configured in absorptive, reflective, diffusive, or fluorescent arrangements to produce the effects described above. It is also quite feasible, for example, to use thermotropic effects on disclinations to increase the diffusivity of an LC device. None of these variations alter the essential nature of the device or the methods for producing it. Rather the "thermochromic LC" in all its various forms is treated as a single component 902 within a substrate material 903.

Although these numerous variations are difficult to capture visually and are not individually elucidated in FIG. 9, the various molecules and materials used in the methodologies disclosed herein are well described in the prior art and will be readily understood by a reader of ordinary skill in the art of liquid crystal device fabrication. With respect to the technology disclosed and described herein, it is the method of exploiting the thermochromic effects of various molecules and materials for use in flexible optical filters that is important. All of the above variations are exemplary (rather than limiting) forms of this implementation of a method for constructing robust, flexible thermochromic (including thermodiffusive and thermoreflective) filters using various thermochromic or thermotropic arrangements of liquid crystal without the need for the two polarizers described in earlier embodiments. Many of these devices will also work in conjunction with one or more polarizers (not pictured in FIG. 9), because they have polarizing effects or are polarizers themselves, and that their function may be significantly improved as a result. In addition, even the polarizer-free forms of this embodiment may be sandwiched between two polymer films 903 that have been prepared with appropriate alignment layers, rather than distributed within a single flexible substrate 903.

Figure 10:
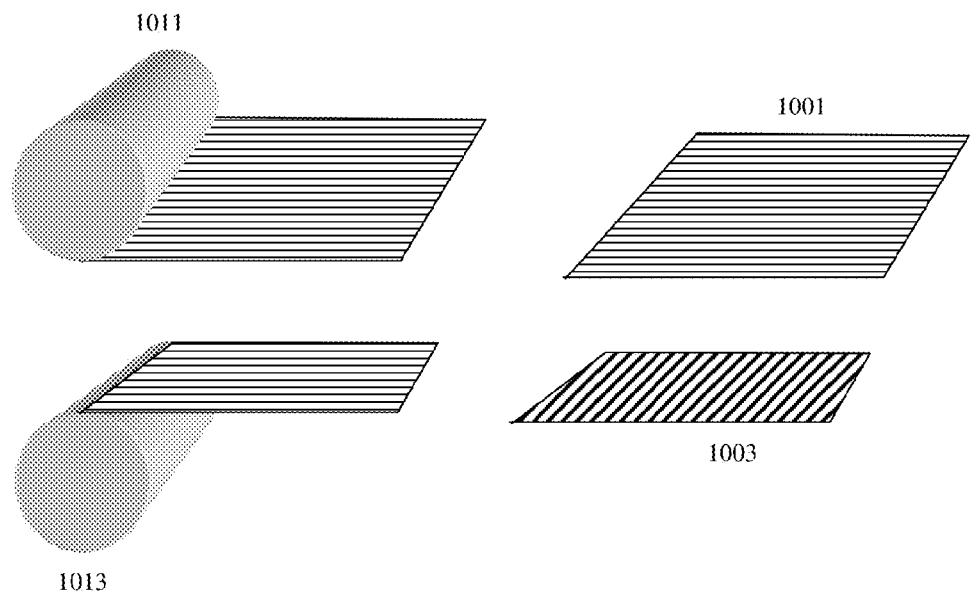
FIG. 10 is a schematic illustration of a roll-to-sheet fabrication process involving linear polarizers whose polarization direction is aligned with the polymer draw direction.

FIG. 10 is a schematic illustration of a roll-to-sheet fabrication process. In this exemplary fabrication method, the polarizers 1001 and 1003 are polymer-based linear polarizers whose polarization axis is aligned with the polymer drawn direction. In this embodiment, a square or other shaped piece of material 1001 is cut from the upper polymer roll 1011, and a matching square or other shaped piece 1003 is cut from the lower polymer roll 1013, and then rotated such that its polarization axis is 90 degrees (or some other desired angle) from that of the upper piece 1001. The liquid crystal or other depolarizer (not pictured) is then added between the two sheets and the edges are sealed, as described above.

Figure 11:
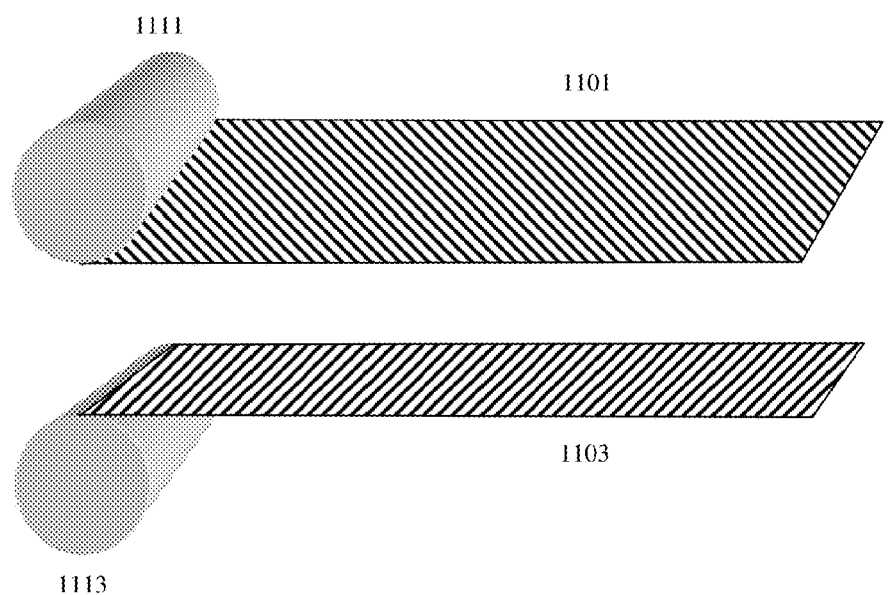
FIG. 11 is a schematic illustration of a roll-to-toll fabrication process involving linear polarizers whose polarization direction is aligned at 45 degrees to the polymer draw direction.

FIG. 11 is a schematic illustration of a roll-to-toll fabrication process involving linear polarizers whose polarization direction is aligned at 45 degrees to the polymer draw direction. One polarizer, aligned at 45 degrees from its draw direction, will be at 90 degrees to a similar polarizer which has been flipped over. Therefore, in this embodiment, the two polarizers 1101 and 1103 can be pulled continuously off the rolls 1111 and 1113. The liquid crystal or other thermotropic depolarizer (not pictured) may then be added between them and the edges sealed, as described above. This embodiment of the fabrication method is superior in that the resulting continuous thermochromic filter can be wound onto another roll in the sort of "roll to roll" or "web winding" process that is very familiar to workers in the polymer films industry. It also allows large quantities of thermochromic (e.g., thermoreflective) film to be shipped using industry standard methods. Angles than 45 degrees may be employed to produce different optical effects and multiple draw directions could be used to create patterns in the filter as desired for particular applications.

In addition, if the liquid crystal mixture placed between the two polarizers is a polymer-dispersed liquid crystal (PDLC), polymer stabilized twisted nematic (PSTN), or other stabilized mixture with a solid or gelled consistency, then individual thermochromic filters can be cut from the roll (e.g., with scissors or other cutting blade), and the resulting filter is usable and durable even without heat sealing of the edges. Thus, the thermochromic filter is more industrially applicable and can be used even by unskilled persons, as with ordinary window films that are marketed directly to consumers.

Figure 12:
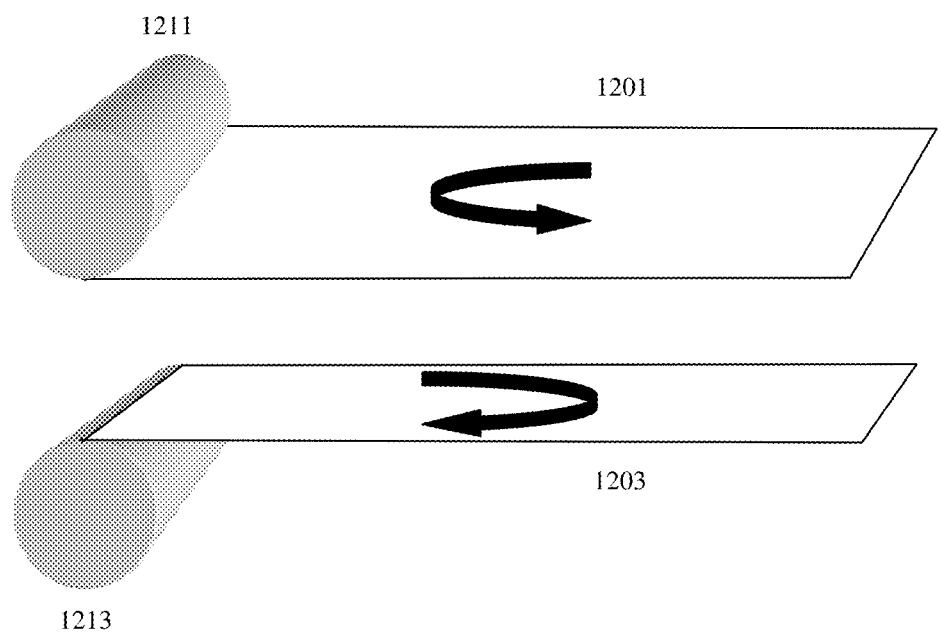
FIG. 12 is a schematic illustration of a roll-to-toll fabrication process involving circular polarizers of opposite helicity.

FIG. 12 is a schematic illustration of a roll-to-toll fabrication process involving circular polarizers of opposite helicity, such as for example the cholesteric liquid crystal polymer circular polarizers made by Chelix Technologies. This process is similar to that of FIG. 11, except that the polarizers are of a different type. Specifically, they are right-handed and left-handed circular polarizers, respectively. In general, it does not matter whether the upper polarizer 1201 or the lower polarizer 1203 are right- or left-handed. However, depending on the configuration of the depolarizer (not pictured) they will need to be either both of the same handedness or of opposite handedness in order to function correctly. The depolarizer between these two polarizers may take many forms. For example, it may be a twisted nematic liquid crystal, as described for example in U.S. Pat. No. 5,319,478 to Funfschilling et al.; it may be a pi cell, pi-phase retardation panel, or controlled birefringence cell as described for example in U.S. Pat. No. 6,912,018 to Faris et. al; or it may have some other structure such that through the interaction of the depolarizer (not pictured) and the circular polarizers 1201 and 1203, incoming light is largely blocked in one state and largely transmitted in the other. However, in these cases the depolarizer must be thermotropic (e.g., a low-clearing-point liquid crystal), as opposed to the disclosure of the aforementioned patents, which describe electrochromic devices wherein the depolarizer is actuated by an electric field. In contrast, the technology disclosed herein describes a method for producing flexible thermochromic (e.g., thermoreflective, thermodiffusive, thermodarkening, and color-changing) filters, wherein the optical properties of the depolarizer are actuated by temperature rather than by electric fields.

Although the foregoing embodiments have been described with particularity, numerous variations are possible for making flexible thermochromic (e.g., thermoreflective, thermodiffusive, or thermodarkening) filters. For example, in other embodiments, thermochromic and/or thermotropic (e.g. thermoreflective) LC filters that do not use polarizers to function can be constructed using flexible photopolymers with one or more UV protection layers as the bottle.

In other embodiments, the liquid crystal may be contained inside structures, such as polymer spheres, or it may be loaded between the two sides of the bottle using inkjet application, so-called "slop and glop" methods, pressure injection or vacuum drawing, immersion, and other methods.

In other embodiments, the filter may be sealed and/or cut (sized) using pressure, heat radiation and/or light, laser or water cutters, external and/or internal adhesives, glues or materials such as polymers or plastics, a heat sealer and/or knife, an adhesive installing and sealing knife, or by cutting outside of subdivisions in the filter. Additionally, the filter may be sealed by having spacers which when melted and/or placed under pressure become an adhesive layer.

In other embodiments, one or more layers or materials may be included to improve the heating and/or cutting properties of the filter. These layers may include dyes or metallic spheres, rods, etc. tuned to respond to specific frequencies of radiation or laser light.

In other embodiments, one or more additional layers may be included to allow for the filter to be affixed or adhered to walls, windows, and other objects, and which may be integrated into the filter itself, covered with backing to prevent damage or premature adhesion, or be externally applied prior to affixing the filter itself.

In other embodiments, the filter may have additional layers or materials, attached via adhesives or manufactured integrally as part of the filter, to protect it from heat, humidity and weather damage, to operate as a UV blocker (including polarizers and distributed Bragg reflectors which reflect or absorb UV), or can be removed before or after application to protect the filter during transport and/or installation.

In other embodiments, the filter may be manufactured using web winding processes or methods, or rolled up after manufacture, or stacked in sheets, or affixed to another object, to improve the transportability, handleability, and laminability of the filter.

In other embodiments, the filter may be used to construct objects with thermochromic properties, either before or after shipping, by sewing, laminating, gluing, chemically or heat-bonding, wedge welding, or otherwise attaching separate pieces of filter, and/or by using the heat-sealable subdivided gasket or other related approach to prevent damage to one section of the object from affecting other sections.

In other embodiments, human factors of widespread use of the filter may be improved by utilizing reflective, specular, diffusive, absorptive, or infrared polarizers, or mixtures of these types.

In other embodiments, an electrochromic override may be included in the filter, by utilizing attachments points to include conductive layers in the filter, such as wire-grid polarizers, in such a way that it is possible to both cut and seal the filter and still provide a conductive channel.

In other embodiments, a thermal override may be included in the filter (e.g., resistive heating using transparent electrodes including but not limited to indium tin oxide coatings).

In other embodiments, various layers or materials may be included that provide good sealing properties with good alignment properties.

In other embodiments, the filter may be mounted or affixed inside of a window, IGU, or other object to protect the filter from weather and other harmful exposures.

In other embodiments the filter may be affixed to the outside of virtually any object exposed to the sun (and thus solar heat gain), for example, windows and walls, as a means of retrofitting for solar heat gain control.

In other embodiments, air and gas bubbles may be removed, prevented from forming, or directed out of the viewing area before or following sealing of the filters utilizing chemical or physical absorption of the components of the air or gas by components or layers of the filter, directed air pressure, gravity or capillary action, using vacuum, and/or vibration. For example, the liquid crystal mixture (whether or not including spacer beads, polymer or adhesive dopants, chiral dopants, or other additives) may be exposed to vacuum in a vacuum chamber to remove dissolved air prior to its inclusion in the thermochromic filter.

In other embodiments, gaskets, plugs, or interconnections of the filter that remain flexible may be created using flexible adhesives such as 3M 88211 or two-sided tape, or chemically sealed, radiation sealed, or heat sealed films that remain flexible during and/or after the process, and externally or internally applied flexible gaskets and plugs.

In other embodiments, the gaskets (e.g., heat-sealed gaskets) may be made to be more ductile by applying chemicals (e.g., solvents, acids, bases, sealants) to the gaskets to alter their chemical and/or physical properties.

In other embodiments, the external gasket can be formed using a hot melt polymer such as Poly-iso-butylenes (PIB), or a flexible adhesive such as epoxy resin, to create a flexible external gasket. The material of this gasket can additionally be drawn into the space between the sides of the bottle using capillary action to create an internal as well as external gasket.

In other embodiments polarizers, which are somewhat diffusive in reflection and somewhat transmissive in reflection, may be used to create a filter which is window-like while reducing glare. Alternatively or in combination, thermotropic guest-host LC designs may be used to adjust the contrast ratio of polarizer-free devices or to adjust the contrast ratio of polarizing embodiments without realigning or misaligning the polarizer or polarizers in the device.

In other embodiments, self-sealing gaskets or plugs may be employed.

In other embodiments, the chemistry and components of the gasket, plugs, and/or interconnections may be chosen to be compatible with the thermotropic liquid crystal over sustained or repeated exposures to UV, light, heat, humidity, or other environmental factors.

In other embodiments, optional enhancements such as antireflection coatings or refraction-matching coatings may be added either to the polarizing films or to the spacer beads to improve their transparency or otherwise improve their optical properties.

In other embodiments, any or all of the layers (e.g., UV protection) may be added to the filter via spraying, sputtering, adsorption, and/or polymerization in place, among other methods. In still other embodiments, one or more of the component materials may be heated, exposed to vacuum, or chemically treated to "outgas" them, i.e., to drive out dissolved gases, residual solvents, incompletely polymerized monomers, etc., such that these residual materials do not become a source of potential contamination.

None of these embodiments is to be taken as limiting in any way, and many other methods of aligning, spacing, tensioning, gasketing, cutting, and thermochromically shuttering are possible. In addition, many different forms and types of thermochromic and thermoreflective filters (especially liquid crystal based ones) can be constructed, sized, and shipped using these methods.

Although these embodiments have been described with particular detail, a reader of ordinary skill in the art will understand that numerous additional variations and optional enhancements can be applied. For example, the filters can include additional layers, whether integrated, bonded, or attached via adhesives, that provide protection from heat, humidity, UV, oxygen, ozone and other gases, and other environmental conditions, or a passivating layer (e.g., polyimide) may be applied to prevent the liquid crystal from reacting chemically with certain polymers (e.g., PET) in the polarizing film. The form factor of the filter may be such that it is suitable for web-winding processes, and thus can be delivered in rolls, or such that it is suitable for sheet processes and thus can be delivered in sheets, or may be attached in the place of application before shipping.

Furthermore, although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method for constructing a thermotropically-actuated distributed Bragg reflector comprising:
    combining a photopolymer and a thermotropically-actuated liquid crystal;
    aligning the liquid crystal such that an optical index of the liquid crystal matches an optical index of the photopolymer when the liquid crystal is in an ordered state, and such that the optical index of the liquid crystal mismatches the optical index of the photopolymer when the liquid crystal is in a disordered state; and photopolymerizing the photopolymer to enclose the thermotropically-actuated liquid crystal such that the liquid crystal is free to transition between the ordered and disordered states responsive to temperature changes;

wherein the aligning operation includes providing an electric field across the liquid crystal to align the optical index of the liquid crystal at the optical index of the photopolymer during the photopolymerizing operation.

2. The method of claim 1, wherein the photopolymerizing operation further comprises:

photopolymerizing the photopolymer in layers; and trapping the liquid crystal between adjacent layers of the photopolymer in an alternating structure.

3. The method of claim 1 further comprising mixing the photopolymer and the thermotropically-actuated liquid crystal, wherein the liquid crystal is encapsulated interstitially within the photopolymer during the photopolymerization operation.

4. The method of claim 1 further comprising doping the liquid crystal with dye molecules having absorptive, reflective, or diffusive properties, or any combination thereof.

5. The method of claim 4 further comprising mixing a surface coupling agent with the liquid crystal.

6. The method of claim 5, wherein the surface coupling agent is an amphiphilic compound.

7. The method of claim 4, wherein the dye is either a positive dichroic dye or a negative dichroic dye.

8. The method of claim 4, wherein the dye is absorptive of light polarized along an axis of a molecule of the dye.

9. A method for constructing a thermotropically-actuated distributed Bragg reflector comprising:

combining a photopolymer and a thermotropically-actuated liquid crystal;

aligning the liquid crystal such that an optical index of the liquid crystal matches an optical index of the photopolymer when the liquid crystal is in an ordered state, and such that the optical index of the liquid crystal mismatches the optical index of the photopolymer when the liquid crystal is in a disordered state;

photopolymerizing the photopolymer in layers to enclose the thermotropically-actuated liquid crystal such that the liquid crystal is free to transition between the ordered and disordered states in response to temperature changes; and trapping the liquid crystal between adjacent layers of the photopolymer in an alternating structure.

10. The method of claim 9 further comprising doping the liquid crystal with dye molecules having absorptive or reflective properties.

11. The method of claim 10 further comprising mixing a surface coupling agent with the liquid crystal.

12. The method of claim 11, wherein the surface coupling agent is an amphiphilic compound.

13. The method of claim 10, wherein the dye is either a positive dichroic dye or a negative dichroic dye.

14. The method of claim 10, wherein the dye is absorptive of light polarized along an axis of a molecule of the dye.

* * * * *